US010080210B2

(12) United States Patent
Vanderveen et al.

(10) Patent No.: US 10,080,210 B2
(45) Date of Patent: Sep. 18, 2018

(54) METHODS AND APPARATUS FOR PROVIDING NETWORK-ASSISTED PAGING OF LTE DEVICES VIA A COMMON ENTITY

(71) Applicant: QUALCOMM Incorporated, San Diego, CA (US)

(72) Inventors: Michaela Vanderveen, Tracy, CA (US); Georgios Tsirtsis, London (GB); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 13/753,073

(22) Filed: Jan. 29, 2013

(65) Prior Publication Data
US 2013/0196693 A1  Aug. 1, 2013

Related U.S. Application Data

(60) Provisional application No. 61/593,261, filed on Jan. 31, 2012.

(51) Int. Cl.
*H04W 68/00* (2009.01)
*H04W 12/04* (2009.01)
*H04W 76/14* (2018.01)

(52) U.S. Cl.
CPC ........... *H04W 68/00* (2013.01); *H04W 12/04* (2013.01); *H04W 68/005* (2013.01); *H04W 76/14* (2018.02)

(58) Field of Classification Search
CPC ... H04W 68/00; H04W 76/14; H04W 68/005; H04W 12/04; H04W 36/0088; H04W 76/11; H04W 72/02; H04W 76/021; H04L 65/1083

USPC .................................. 455/458, 411, 414.1
See application file for complete search history.

(56) References Cited

U.S. PATENT DOCUMENTS

| 8,064,907 B2 | 11/2011 | Gallagher et al. |
| 8,111,712 B2 | 2/2012 | Mutikainen et al. |
| 8,307,097 B2 * | 11/2012 | Bovo .................... H04L 41/12 370/392 |

(Continued)

FOREIGN PATENT DOCUMENTS

| CN | 1757258 A | 4/2006 |
| JP | 2006-523404 A | 10/2006 |

(Continued)

OTHER PUBLICATIONS

International Search Report and Written Opinion—PCT/US2013/023885—ISA/EPO—dated May 31, 2013.

*Primary Examiner* — Mahendra Patel
(74) *Attorney, Agent, or Firm* — Arent Fox LLP

(57) ABSTRACT

A method, an apparatus, and a computer program product for wireless communication are provided. In one configuration, the apparatus is a target UE. The target UE communicates an expression of the target UE to a serving entity, receives a page initiated from the serving entity for communicating with an initiator UE, and communicates securely with the initiator UE based at least on the page. In one configuration, the apparatus is a serving entity. The serving entity receives a first expression from a target UE, receives a second expression from an initiator UE, and sends a page to the target UE upon determining that the second expression matches the first expression.

6 Claims, 28 Drawing Sheets

(56) References Cited

U.S. PATENT DOCUMENTS

| | | | |
|---|---|---|---|
| 2006/0160544 A1* | 7/2006 | Sun | H04W 8/18 455/456.1 |
| 2007/0171910 A1* | 7/2007 | Kumar | H04L 63/0428 370/392 |
| 2009/0017843 A1* | 1/2009 | Laroia | H04W 76/14 455/458 |
| 2009/0270099 A1* | 10/2009 | Gallagher | H04W 8/08 455/435.1 |
| 2010/0279670 A1* | 11/2010 | Ghai | H04L 65/1083 455/414.3 |
| 2011/0055567 A1* | 3/2011 | Sundaram | H04L 9/0825 713/169 |
| 2011/0274041 A1* | 11/2011 | Perras et al. | 370/328 |
| 2012/0189016 A1 | 7/2012 | Bakker et al. | |
| 2012/0294270 A1 | 11/2012 | Yamada et al. | |

FOREIGN PATENT DOCUMENTS

| | | | |
|---|---|---|---|
| JP | 2011-155336 A | 8/2011 | |
| WO | 2004080103 A1 | 9/2004 | |
| WO | WO 2004080103 A1 * | 9/2004 | H04W 8/18 |
| WO | 2009009394 | 1/2009 | |
| WO | WO 2009009394 A1 * | 1/2009 | H04W 76/14 |
| WO | WO-2010/078271 A2 | 7/2010 | |
| WO | WO-2011/153269 A1 | 12/2011 | |

* cited by examiner

METHODS AND APPARATUS FOR PROVIDING NETWORK-ASSISTED PAGING OF LTE DEVICES VIA A COMMON ENTITY

CLAIM OF PRIORITY UNDER 35 U.S.C. § 119

The present Application for Patent claims priority to Provisional Application No. 61/593,261 entitled "NETWORK-ASSISTED PAGING OF LTE DEVICES VIA A COMMON ENTITY" filed Jan. 31, 2012, and assigned to the assignee hereof and hereby expressly incorporated by reference herein.

BACKGROUND

Field

The present disclosure relates generally to communication systems, and more particularly, to network-assisted paging of Long Term Evolution (LTE) devices via a common entity.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer program product, and an apparatus are provided. The apparatus may be a target UE. The target UE communicates an expression of the target UE to a serving entity. The target UE receives a page initiated from the serving entity for communicating with an initiator UE. The target UE communicates with the initiator UE based at least on the page.

According to related aspects, a method for providing network-assisted paging of LTE Devices via a common entity is provided. The method can include communicating an expression of a target UE to a serving entity. Further, the method can include receiving a page initiated from the serving entity for communicating with an initiator UE. Moreover, the method may include communicating with the initiator UE based at least on the page.

Another aspect relates to a communications apparatus enabled to provide network-assisted paging of LTE Devices via a common entity. The communications apparatus can include means for communicating an expression of a target UE to a serving entity. Further, the communications apparatus can include means for receiving a page initiated from the serving entity for communicating with an initiator UE. Moreover, the communications apparatus can include means for communicating with the initiator UE based at least on the page.

Another aspect relates to a communications apparatus. The apparatus can include a processing system configured to communicate an expression of a target UE to a serving entity. Further, the processing system may be configured to receive a page initiated from the serving entity for communicating with an initiator UE. Moreover, the processing system may further be configured to communicate with the initiator UE based at least on the page.

Still another aspect relates to a computer program product, which can have a computer-readable medium including code for communicating an expression of a target UE to a serving entity. Further, the computer-readable medium may include code for receiving a page initiated from the serving entity for communicating with an initiator UE. Moreover, the computer-readable medium can include code for communicating with the initiator UE based at least on the page.

In an aspect of the disclosure, a method, a computer program product, and an apparatus are provided. The apparatus may be a serving entity. The serving entity receives a first expression from a target UE. The serving entity receives a second expression from an initiator UE. The serving entity sends a page to the target UE upon determining that the second expression matches the first expression.

According to related aspects, a method for providing network-assisted paging of LTE Devices via a common entity is provided. The method can include receiving, by a serving entity, a first expression from a target UE. Further, the method can include receiving a second expression from an initiator UE. Moreover, the method may include sending a page to the target UE upon determining that the second expression matches the first expression.

Another aspect relates to a communications apparatus enabled to provide network-assisted paging of LTE Devices via a common entity. The communications apparatus can include means for receiving, by a serving entity, a first expression from a target UE. Further, the communications apparatus can include means for receiving a second expression from an initiator UE. Moreover, the communications apparatus can include means for sending a page to the target UE upon determining that the second expression matches the first expression.

Another aspect relates to a communications apparatus. The apparatus can include a processing system configured to receive, by a serving entity, a first expression from a target UE. Further, the processing system may be configured to receive a second expression from an initiator UE. Moreover, the processing system may further be configured to send a page to the target UE upon determining that the second expression matches the first expression.

Still another aspect relates to a computer program product, which can have a computer-readable medium including code for receiving, by a serving entity, a first expression from a target UE. Further, the computer-readable medium may include code for receiving a second expression from an initiator UE. Moreover, the computer-readable medium can include code for sending a page to the target UE upon determining that the second expression matches the first expression.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
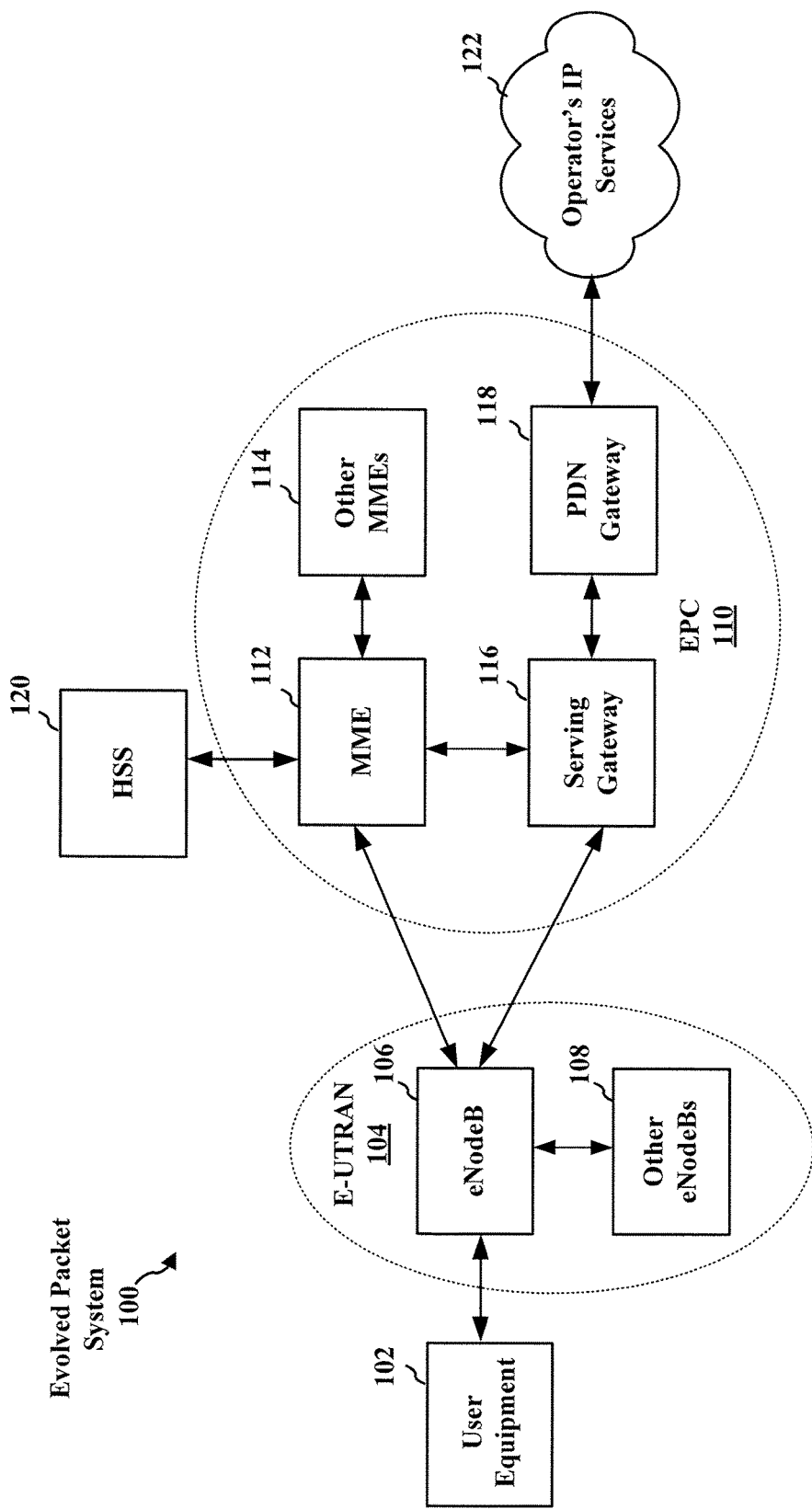
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
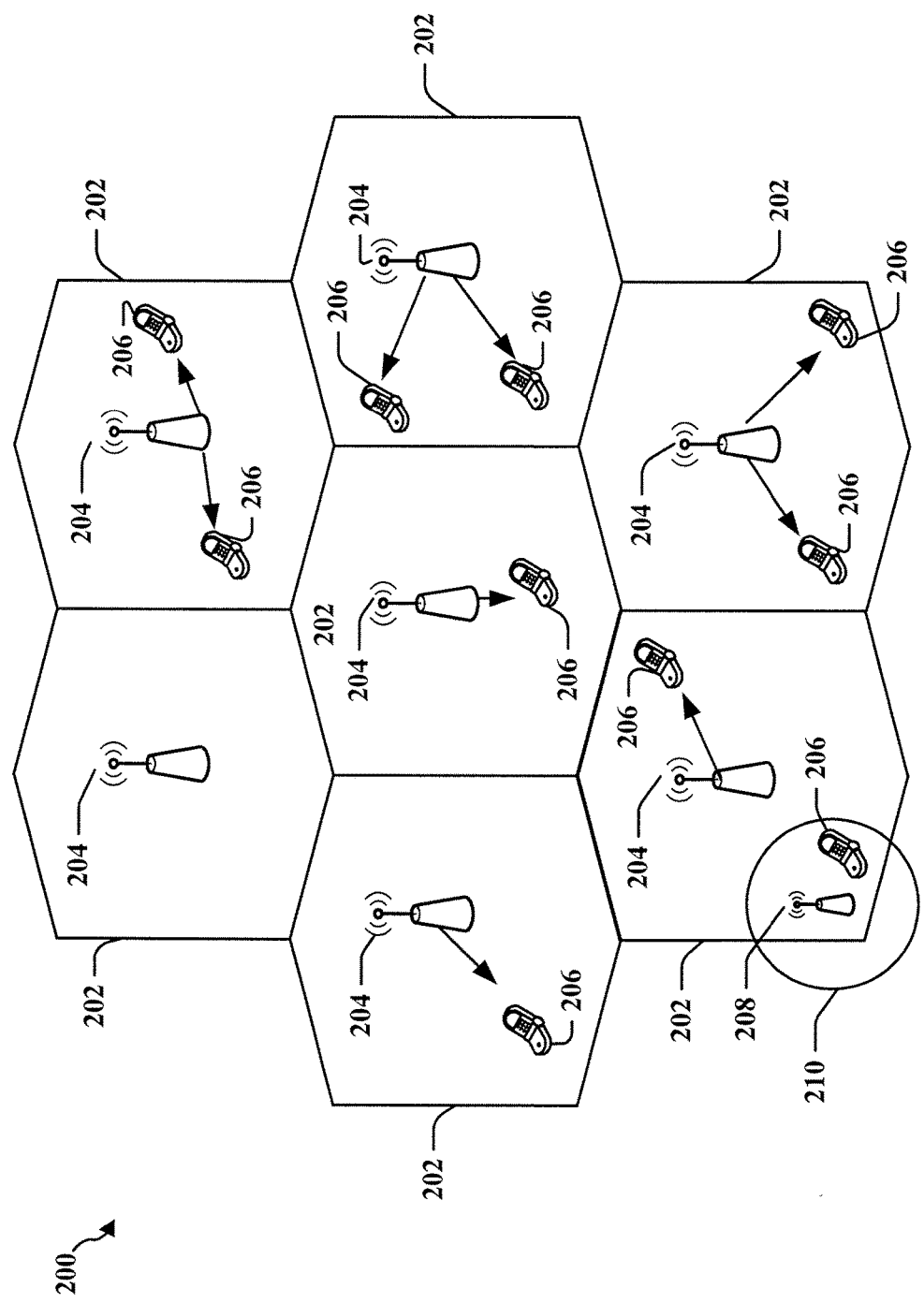
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
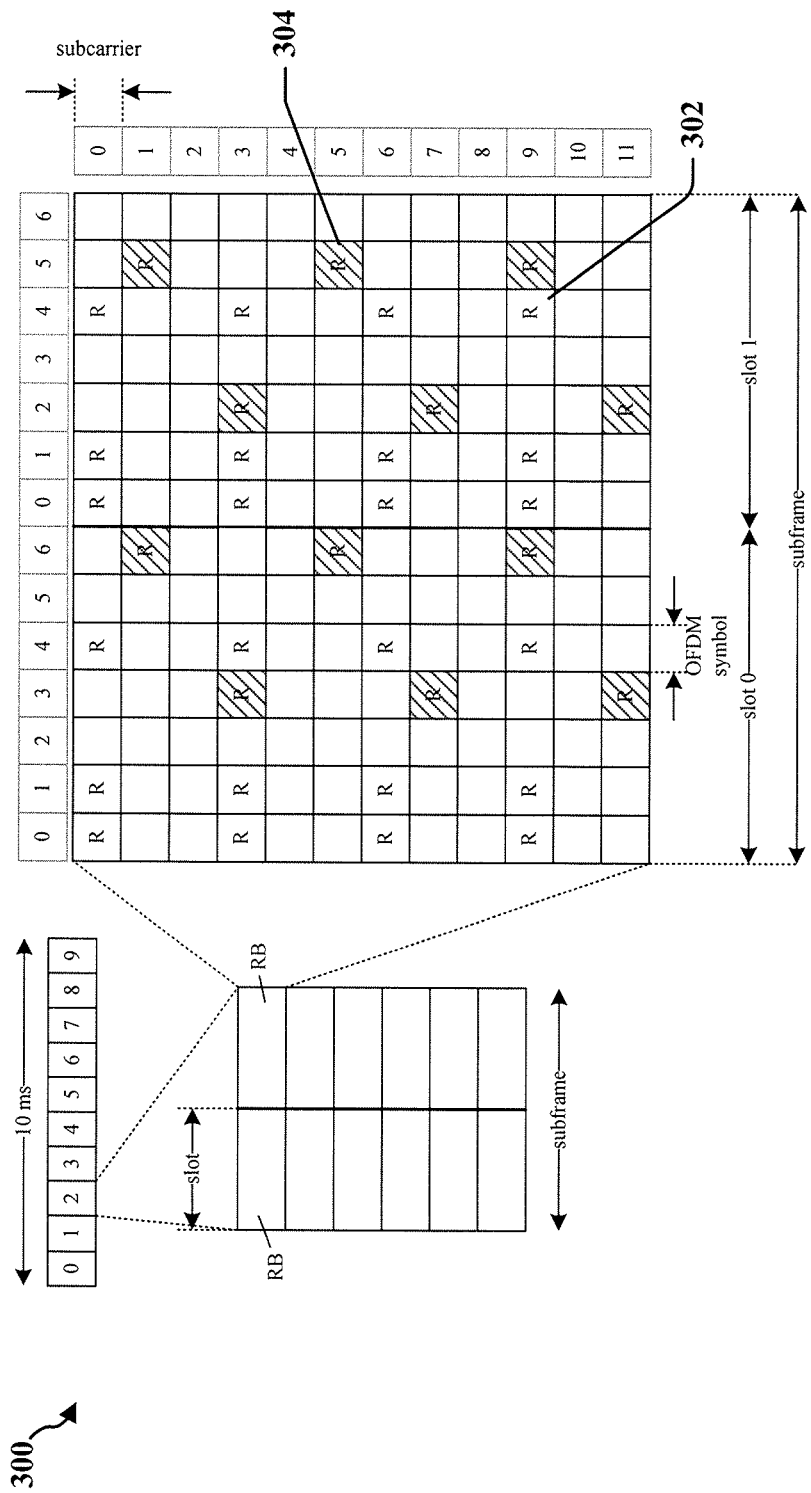
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
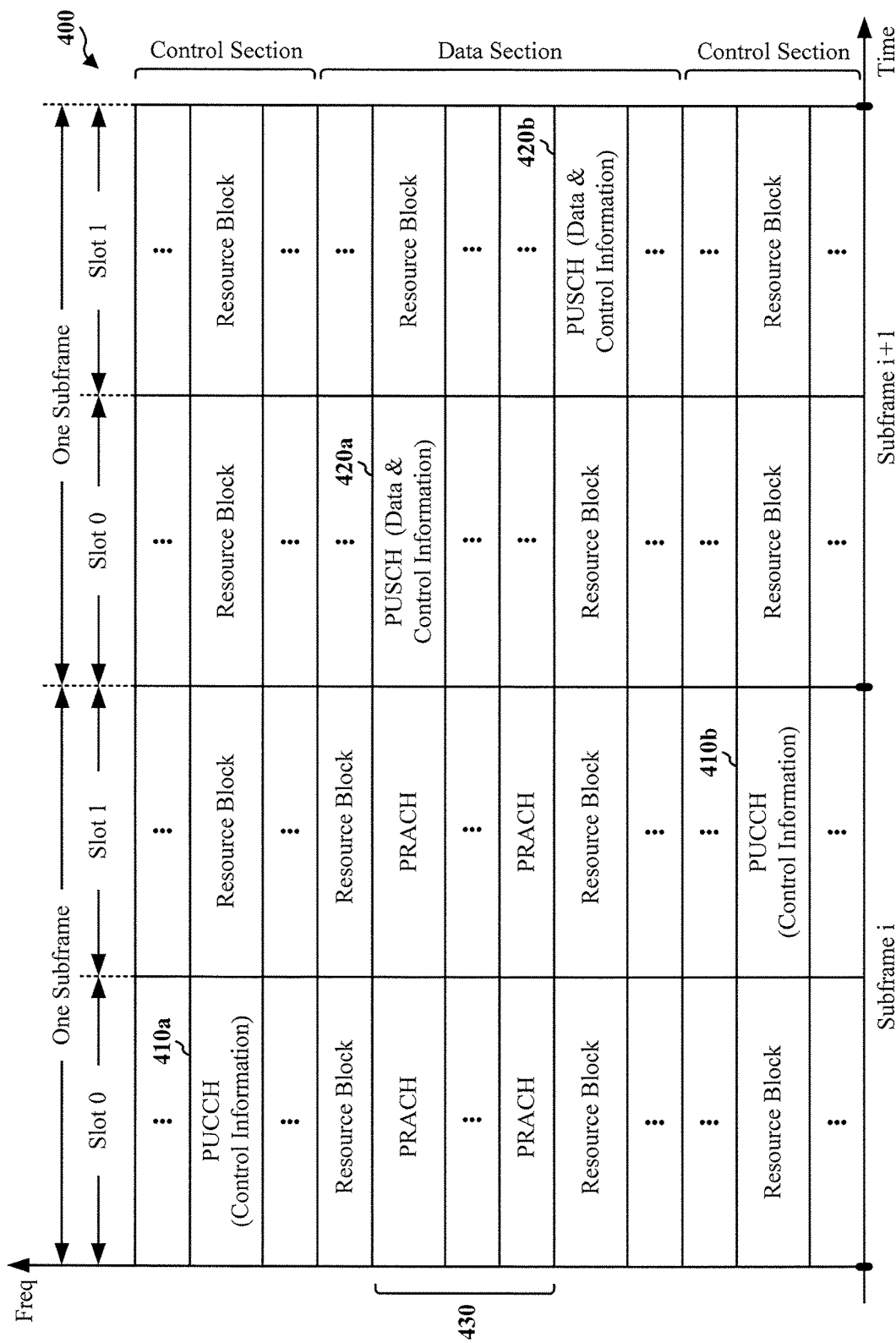
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
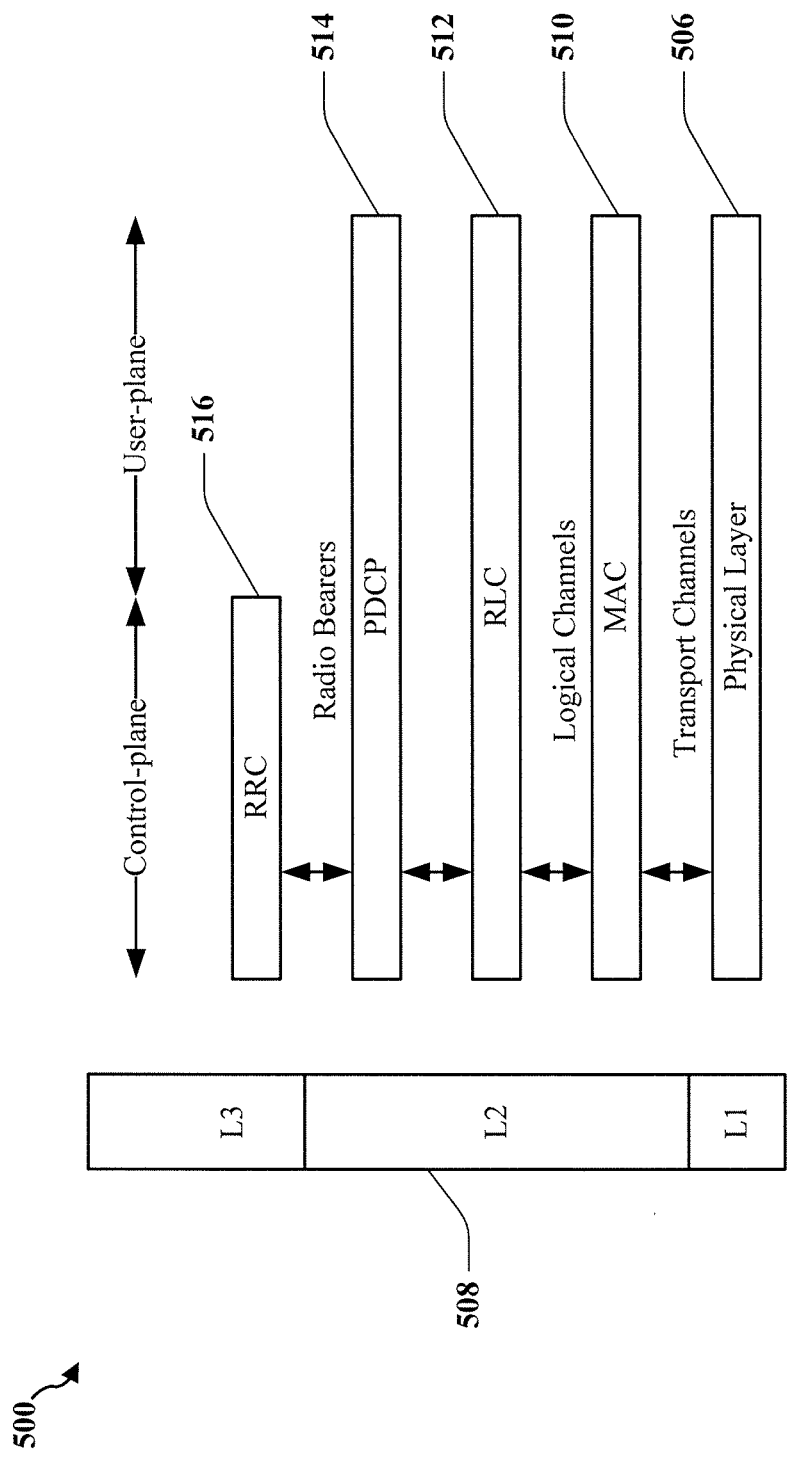
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
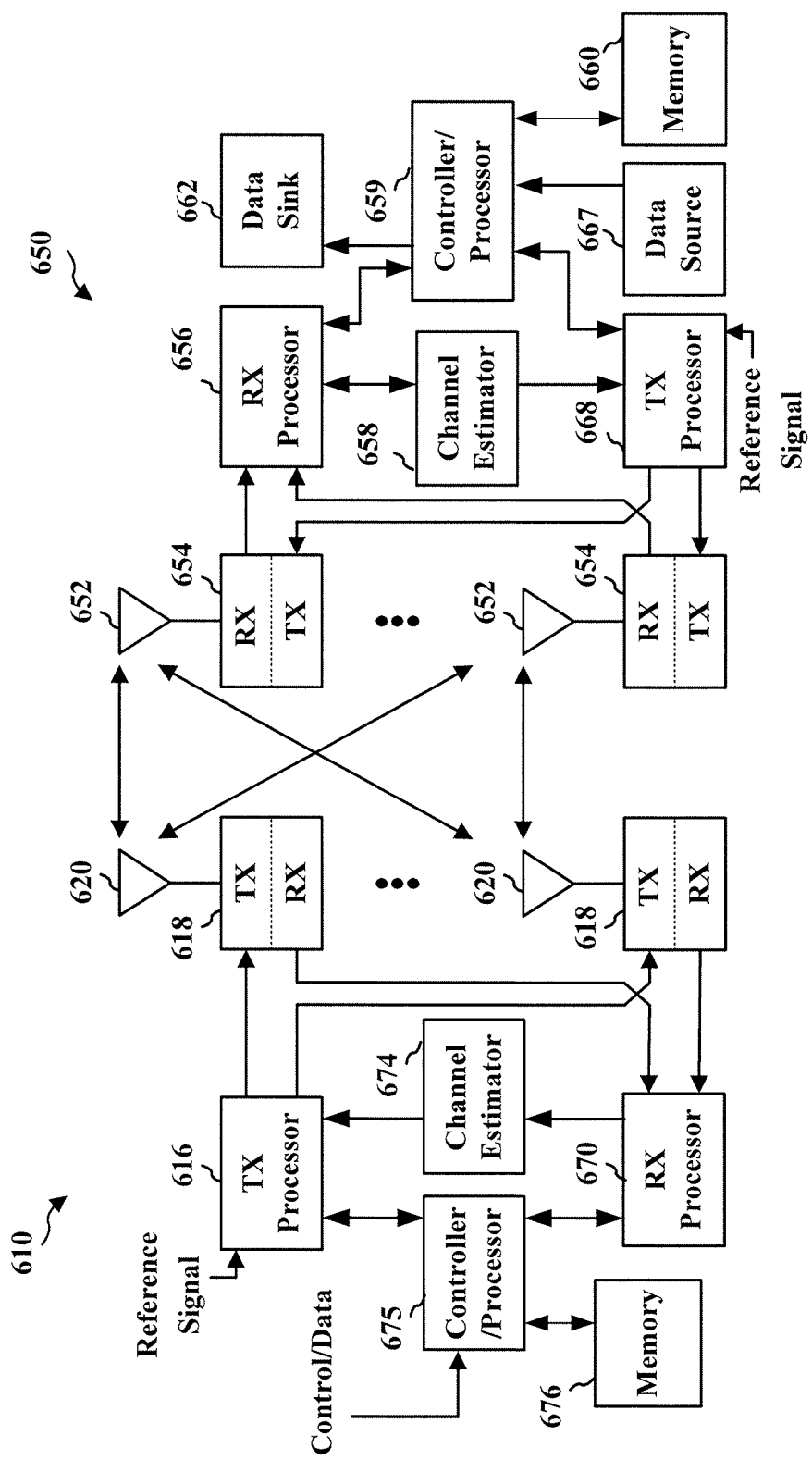
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (e.g., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

UEs may establish a peer-to-peer (also referred to as device-to-device) session directly, through direct communication with each other, or through the assistance of a wireless wide area network (WWAN). The WWAN may provide more or less assistance to two UEs who desire to communicate together. In a first configuration, the WWAN carries UE-to-UE signaling in advance of the direct peer-to-peer communication between UEs. In such a configuration, UEs exchange information over the WWAN to trigger a session setup by one or more Mobility Management Entities (MMEs). In a second configuration, the WWAN does not carry UE-to-UE signaling in advance of the direct peer-to-peer communication between UEs. In such a configuration, UEs only communicate with their respective MMEs prior to direct signaling. In both configurations, MME(s) issue key material and EPS bearer setup information; the operator controls the quality of service (QoS), the temporal frequency of key refresh, etc.; and UEs setup secure radio bearers later by direct signaling. Example methods are provided infra for WWAN assisted peer-to-peer session establishment.

Figure 7:
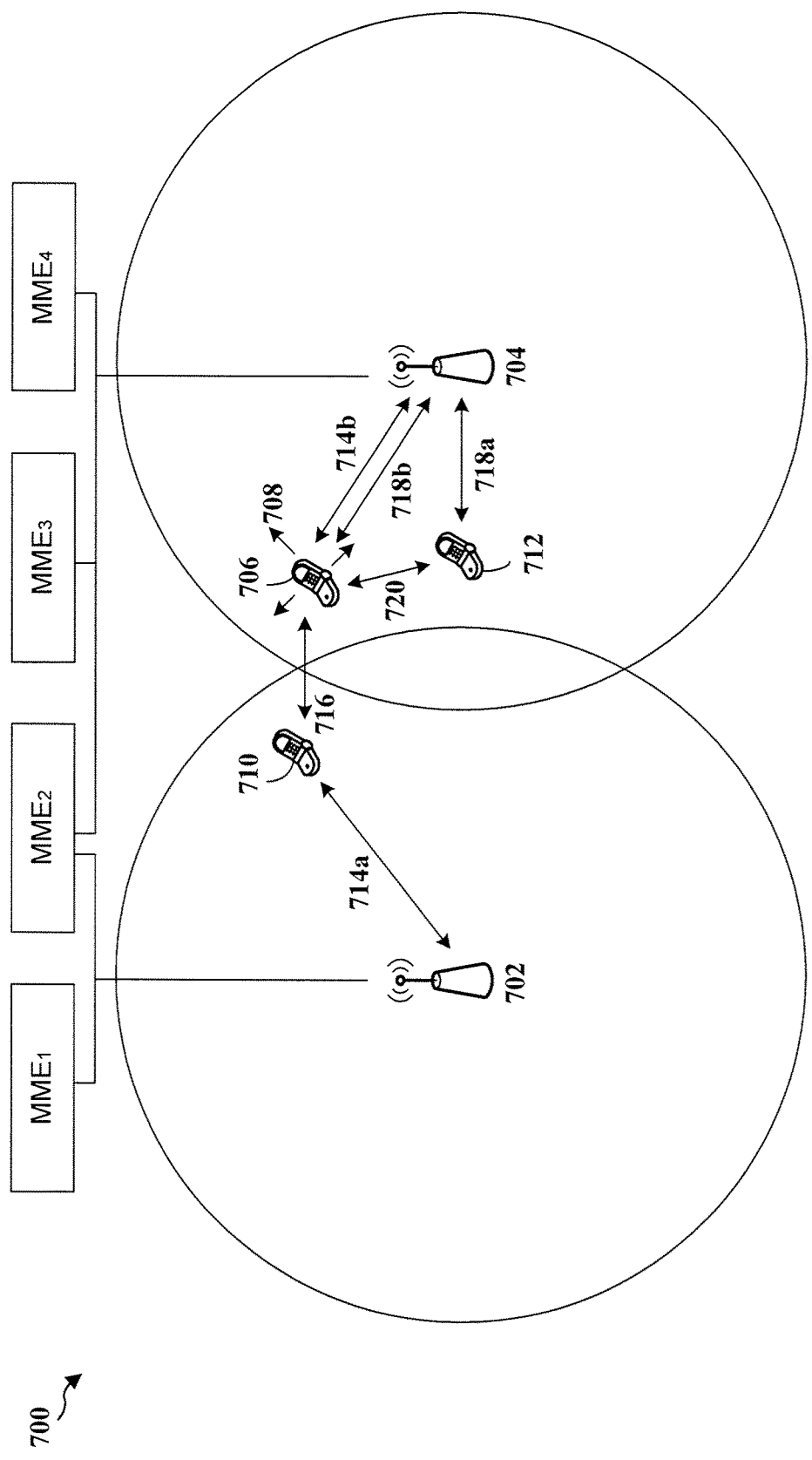
FIG. 7 is a diagram for illustrating example methods.

FIG. 7 is a diagram 700 for illustrating example methods. The eNB 702 is connected to $MME_1$ and $MME_2$ and the eNB 704 is connected to MME$_2$, MME$_3$, and MME$_4$. As such, the UE 710, which is in WWAN communication with the eNB 702, may be served by the MME$_1$ or the MME$_2$. Similarly, the UE 706 and the UE 712, both of which are in WWAN communication with the eNB 704, may each be served by any one of the MME$_2$, MME$_3$, or MME$_4$. As shown in FIG. 7, the UE 706 (target UE) broadcasts an expression 708 so that other UEs may discover the UE 706 for peer-to-peer communication. The expression is a set of characters that the UE 706 may broadcast to help other UEs discover the UE 706 and determine whether they would like to communicate with the UE 706.

The UE 710 (initiator UE) receives the expression and determines that it would like to communicate directly with the UE 706. The UE 710 communicates with its serving MME through WWAN communication 714a with the eNB 702 and the UE 706 communicates with its serving MME (which may be the same MME or a different MME) through WWAN communication 714b with the eNB 704 in order to establish the parameters (e.g., one or more keys and other configurations values) for communicating together 716. Similarly, the UE 712 (initiator UE) receives the expression and determines that it would like to communicate directly with the UE 706. The UE 712 communicates with its serving MME through WWAN communication 718a with the eNB 702 and the UE 706 communicates with its serving MME (which may be the same MME or a different MME) through WWAN communication 718b with the eNB 704 in order to establish the parameters/keys and other configurations for communicating together 720.

Figure 8:
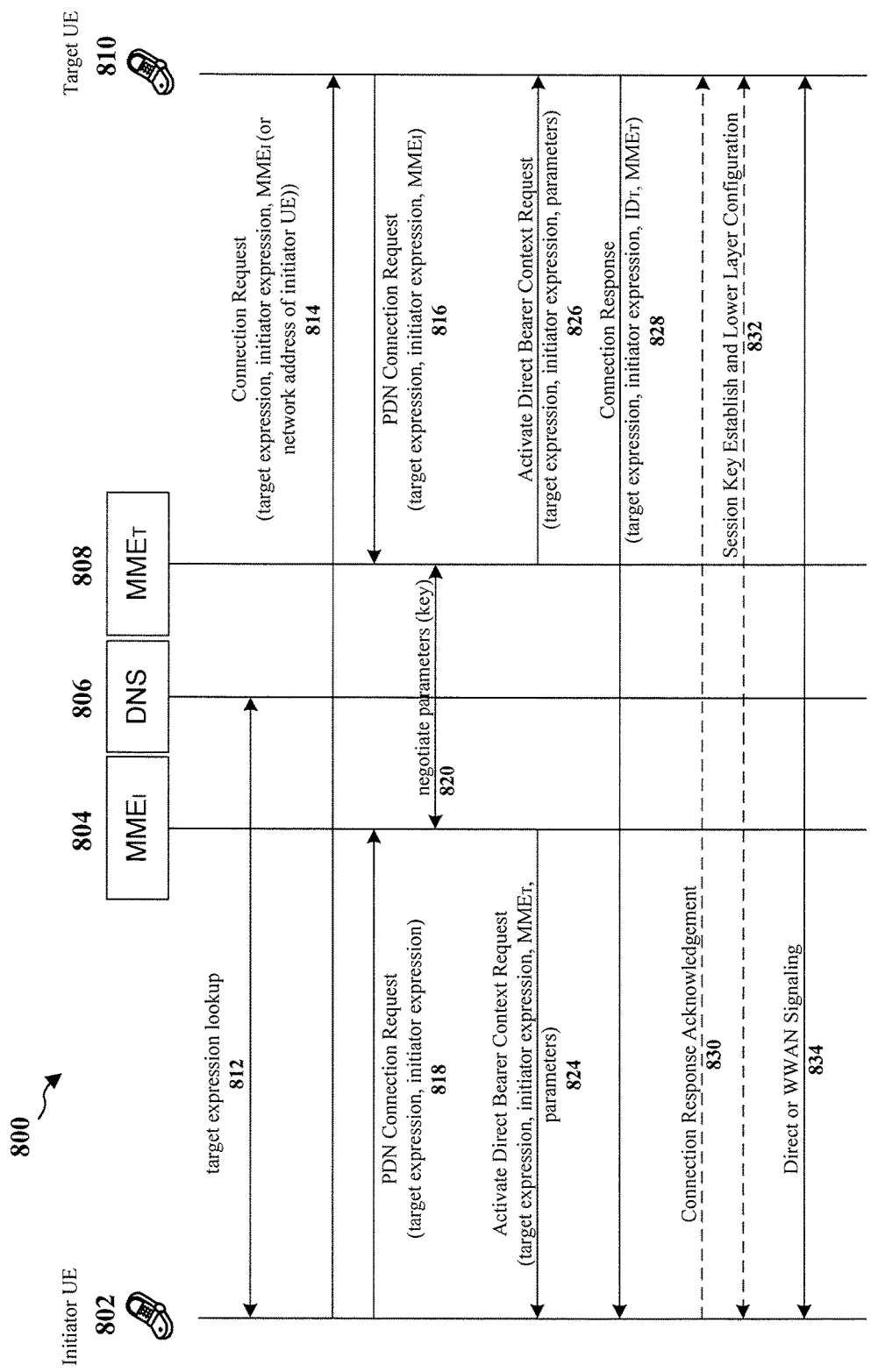
FIG. 8 is a diagram for illustrating a first example method.

FIG. 8 is a diagram 800 for illustrating a first example method. As shown in FIG. 8, in act 812, the initiator UE 802 identifies a target expression of the target UE 810 and looks up the target expression in the domain name server (DNS) 806. From the DNS 806, the initiator UE 802 receives a network address of the target UE 810. In act 814, the initiator UE 802 sends a connection request to the target UE 810 at the received network address. The connection request includes information associated with the initiator UE 802, such as a network address of the initiator UE 802, an initiator expression of the initiator UE 802, and/or information identifying the MME$_I$ 804 serving the initiator UE 802. As used herein, the expression "information identifying an MME" means information that identifies the MME or information that is used to identify the MME. The connection request may further include the target expression. In act 816, the target UE 810 sends a PDN connection request to the MME$_T$ 808. The PDN connection request includes information associated with the initiator UE 802, such as the initiator expression and/or information identifying the MME$_I$ 804. The PDN connection request may further include the target expression. In act 818, the initiator UE 802 sends a PDN connection request to the MME$_I$ 804. The PDN connection request includes information associated with the target UE 810, such as the target expression. The PDN connection request may further include the initiator expression. In act 820, based on the information for identifying the MME$_I$ 804 received in the PDN connection request in act 816, the MME$_T$ 808 contacts the MME$_I$ 804, and the MME$_T$ 808 and the MME$_I$ 804 negotiate parameters for a session establishment between the UEs 802, 810. The parameters may include a key for allowing the UEs 802, 810 to communicate securely together. In act 824, the MME$_I$ 804 sends an activate direct bearer context request to the initiator UE 802. The activate direct bearer context request includes the negotiated parameters. The activate direct bearer context request may further include information identifying the MME$_T$ 808, the target expression, and/or the initiator expression. In act 826, the MME$_T$ 808 sends an activate direct bearer context request to the target UE 810. The activate direct bearer context request includes the negotiated parameters. The activate direct bearer context request may further include the target expression and/or the initiator expression. In act 828, the target UE 810 sends a connection response to the initiator UE 802 in response to the connection request in act 814. The connection response may include information identifying the MME$_T$ 808 and/or an identifier ID$_T$ of the target UE 810. The connection response may further include the target expression and/or the initiator expression. In act 830, the initiator UE 802 may send a connection response acknowledgement to the target UE 810. In act 832, the UEs 802, 810 perform session key establishment and lower layer configuration. In act 834, the UEs 802, 810 communicate directly based on the key through peer-to-peer communication. Alternatively, in act 834, the UEs 802, 810 may communicate together based on the key through the WWAN.

Figure 9:
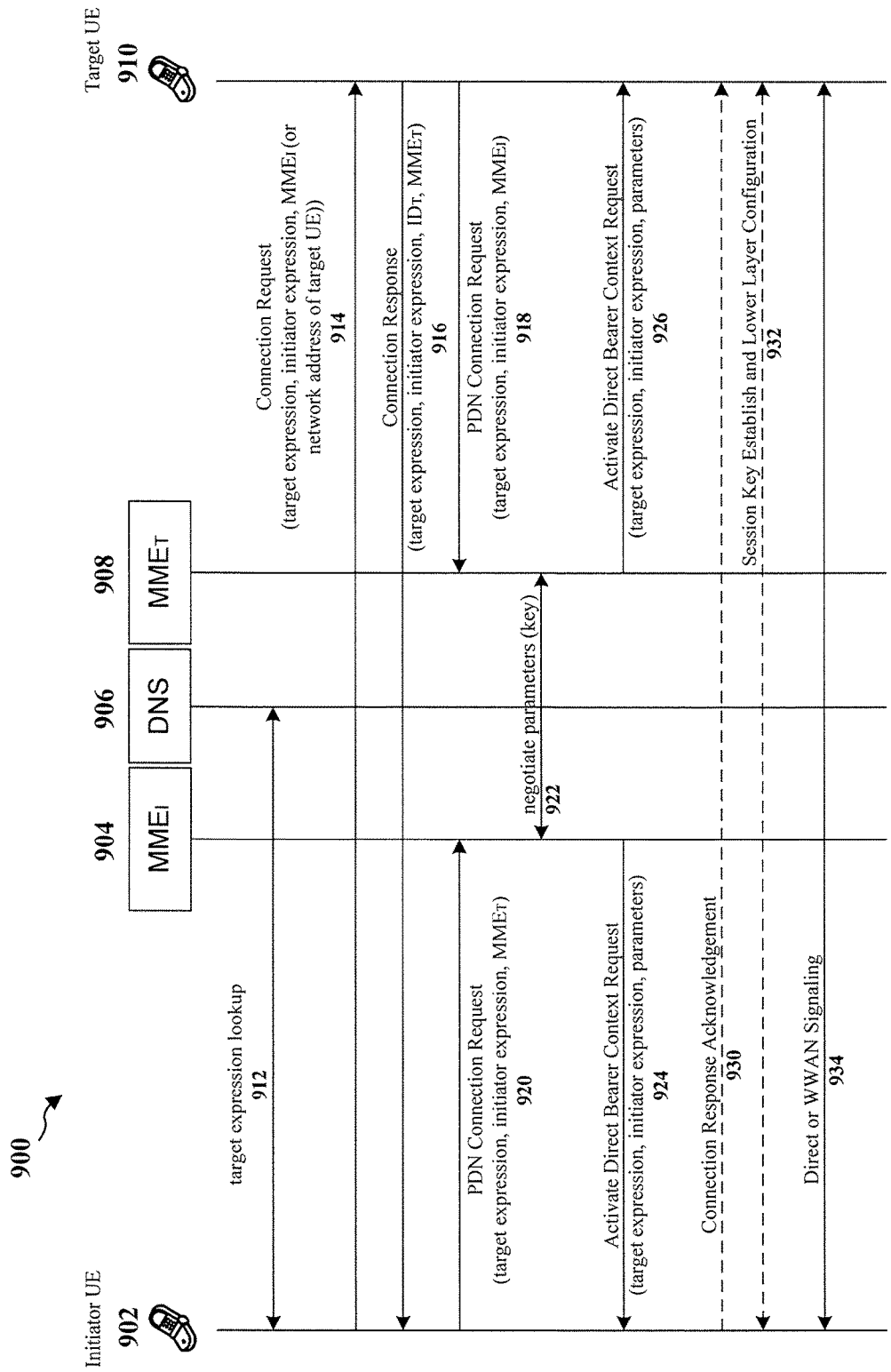
FIG. 9 is a diagram for illustrating a second example method.

FIG. 9 is a diagram 900 for illustrating a second example method. As shown in FIG. 9, in act 912, the initiator UE 902 identifies a target expression of the target UE 910 and looks up the target expression in the DNS 906. From the DNS 906, the initiator UE 902 receives a network address of the target UE 910. In act 914, the initiator UE 902 sends a connection request to the target UE 910 at the received network address. The connection request includes information associated with the initiator UE 902, such as a network address of the initiator UE 902, an initiator expression of the initiator UE 902, and/or information identifying the MME$_I$ 904 serving the initiator UE 902. The connection request may further include the target expression. In act 916, the target UE 910 sends a connection response to the initiator UE 902 in response to the connection request in act 914. The connection response may include information identifying the MME$_T$ 908 and/or an identifier of the target UE 910. The connection response may further include the target expression and/or the initiator expression. In act 918, the target UE 910 sends a PDN connection request to the MME$_T$ 908. The PDN connection request includes information associated with the initiator UE 902, such as the initiator expression and/or information identifying the MME$_I$ 904. The PDN connection request may further include the target expression. In act 920, the initiator UE 902 sends a PDN connection request to the MME$_I$ 904. The PDN connection request includes information associated with the target UE 910, such as the target expression and/or information identifying the MME$_T$ 908. The PDN connection request may further include the initiator expression. In act 922, the MME$_T$ 908 and the MME$_I$ 904 negotiate parameters for a session establishment between the UEs 902, 910. The parameters may include a key for allowing the UEs 902, 910 to communicate securely together. In act 924, the MME$_I$ 904 sends an activate direct bearer context request to the initiator UE 902. The activate direct bearer context request includes the negotiated parameters. The activate direct bearer context request may further include the target expression and/or the initiator expression. In act 926, the MME$_T$ 908 sends an activate direct bearer context request to the target UE 910. The activate direct bearer context request includes the negotiated parameters. The activate direct bearer context request may further include the target expression and/or the initiator expression. In act 930, the initiator UE 902 may send a connection response acknowledgement to the target UE 910. In act 932, the UEs 902, 910 perform session key establishment and lower layer configuration. In act 934, the UEs 902, 910 communicate directly based on the key through peer-to-peer communication. Alternatively, in act 934, the UEs 902, 910 may communicate together based on the key through the WWAN.

Figure 10:
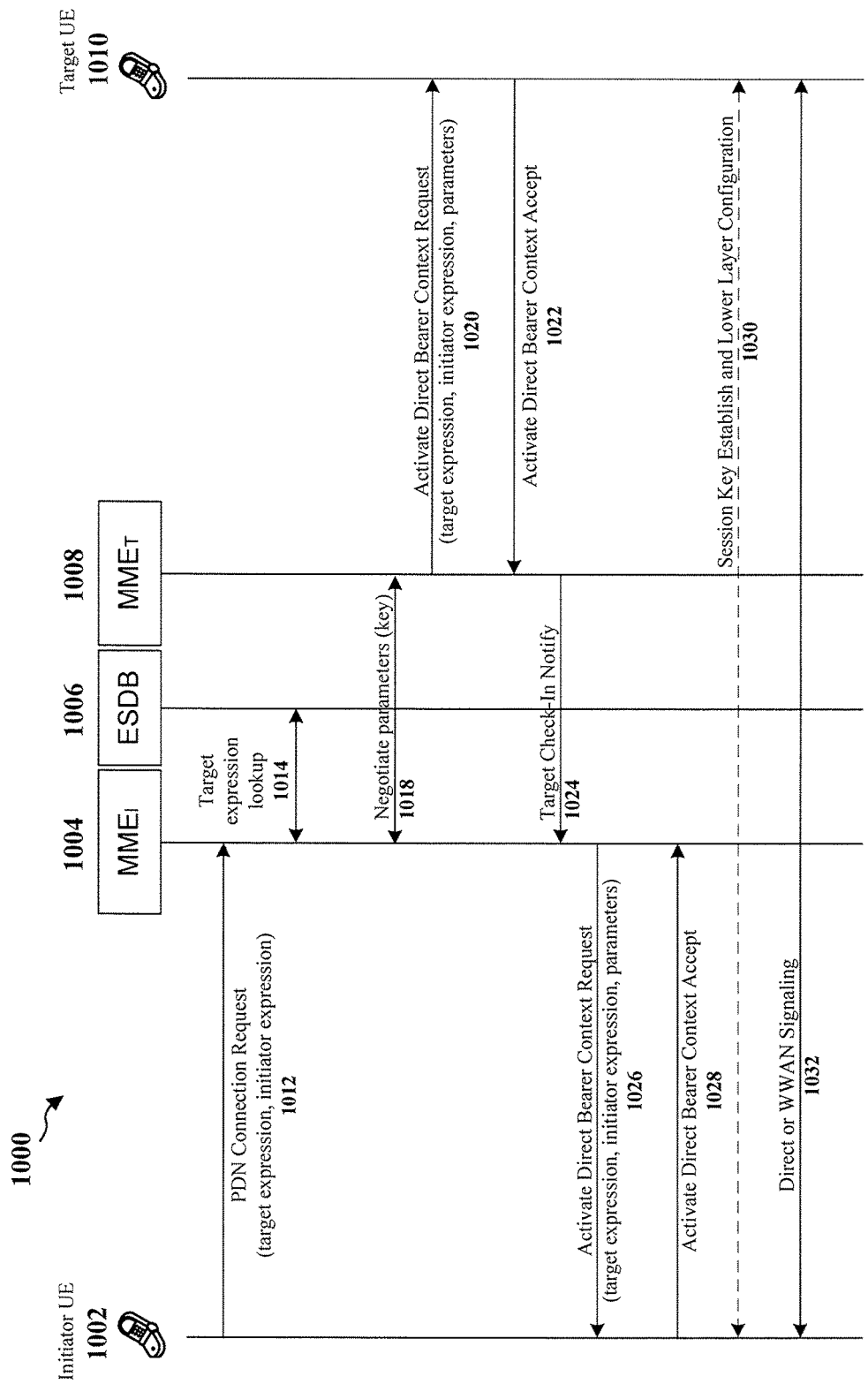
FIG. 10 is a diagram for illustrating a third example method.

FIG. 10 is a diagram 1000 for illustrating a third example method. As shown in FIG. 10, in act 1012, the initiator UE 1002 sends a PDN connection request to the MME$_I$ 1004. The PDN connection request includes a target expression of the target UE 1010 and may further include an initiator expression of the initiator UE 1002. In act 1014, the MME$_I$ 1004 looks up the target expression in an expression subscriber database (ESDB) 1006 to determine the MME$_T$ 1008, which is currently serving the target UE 1010. In an aspect, ESDB 1006 may be a network function that provides storage of current cellular identifiers, or parts thereof, associated with currently active expressions that are for announcement and/or are pageable. In an aspect, ESDB 1006 may be associated with a DNS. In another aspect, ESDB 1006 may be associated with an MME (e.g., MMEs 1004, 1008). In act 1018, the MME$_I$ 1004 contacts the MME$_T$ 1008 and negotiates parameters for a session establishment between the UEs 1002, 1010. The parameters may include a key for allowing the UEs 1002, 1010 to communicate securely together. In act 1020, the MME$_T$ 1008 sends an activate direct bearer context request to the target UE 1010. The activate direct bearer context request includes the negotiated parameters and may further include the target expression and/or the initiator expression. In act 1022, the target UE 1010 sends an activate direct bearer context accept message to the MME$_T$ 1008. In act 1024, the MME$_T$ 1008 sends a target check-in notify message to the MME$_I$ 1004 in order to notify the MME$_I$ 1004 that the target UE 1010 has accepted the activate direct bearer context request. In act 1026, the MME$_I$ 1004 sends an activate direct bearer context request to the initiator UE 1002. The activate direct bearer context request includes the negotiated parameters and may further include the target expression and/or the initiator expression. In act 1028, the initiator UE 1002 sends an activate direct bearer context accept message to the MME$_I$ 1004. In act 1030, the UEs 1002, 1010 perform session key establishment and lower layer configuration. In act 1032, the UEs 1002, 1010 communicate directly based on the key through peer-to-peer communication. Alternatively, in act 1032, the UEs 1002, 1010 may communicate together based on the key through the WWAN.

Figure 11:
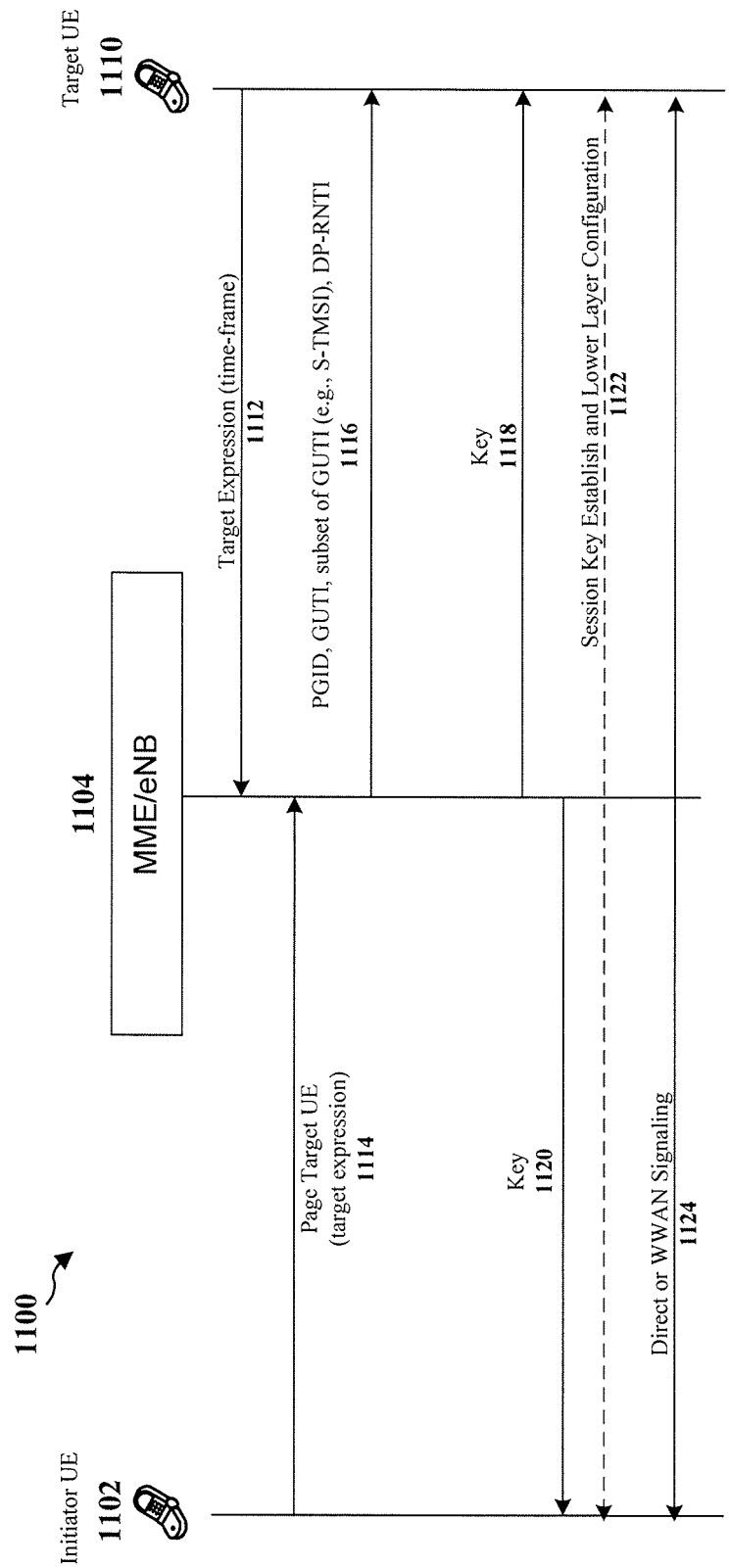
FIG. 11 is a diagram for illustrating a fourth example method.

FIG. 11 is a diagram 1100 for illustrating a fourth example method. As shown in FIG. 11, in act 1112, the target UE 1110 communicates a target expression to a serving entity 1104. The serving entity may be an eNB or an MME. If the serving entity is an MME, the target UE 1110 communicates a target expression to its serving eNB, which communicates the target expression to the MME serving the target UE 1110. The target UE 1110 may also communicate to the serving entity 1104 a time frame in which the target UE 1110 may or may not be paged for communication with other UEs. In act 1114, the initiator UE 1102 pages the target UE by sending a target expression to the serving entity 1104. In act 1116, the serving entity 1104 determines that the target expression received in act 1114 matches the target expression received in act 1112. If the current time is within the time frame in which the target UE 1110 may be paged (if received in act 1112), the serving entity 1104 then sends a page to the target UE 1110. The page may include and at least one a paging identifier (PGID) derived from the target expression, a Globally Unique Temporary Identifier (GUTI), or a subset of the GUTI (e.g., a part or portion of the GUTI) and may be scrambled with a direct paging radio network temporary identifier (DP-RNTI). The GUTI may include a mobile country code (MCC), a mobile network code (MNC), an MME group identifier, an MME code (MMEC), and an MME mobile subscriber identity (M-TMSI). The M-TMSI is device specific. The subset of the GUTI may be a system architecture evolution temporary mobile subscriber identity (S-TMSI), which includes an MMEC and M-TMSI. The page may further include an initiator expression of the initiator UE 1102, assuming the initiator UE 1102 provided the serving entity 1104 with the initiator expression in act 1114 or otherwise the serving entity 1104 knows the initiator expression of the initiator UE 1102. The target UE 1110 may descramble the page based on the DP-RNTI and may decode the page based on the PGID, the GUTI, or the subset of the GUTI, to determine whether its target expression is being paged. In act 1118, the serving entity 1104 sends a key to the target UE 1110 for allowing the UEs 1102, 1110 to communicate securely together. In act 1120, the serving entity 1104 also sends the key to the initiator UE 1102. In act 1122, the UEs 1102, 1110 perform session key establishment and lower layer configuration. In act 1124, the UEs 1102, 1110 communicate directly based on the key through peer-to-peer communication. Alternatively, in act 1124, the UEs 1102, 1110 may communicate together based on the key through the WWAN.

Figure 12:
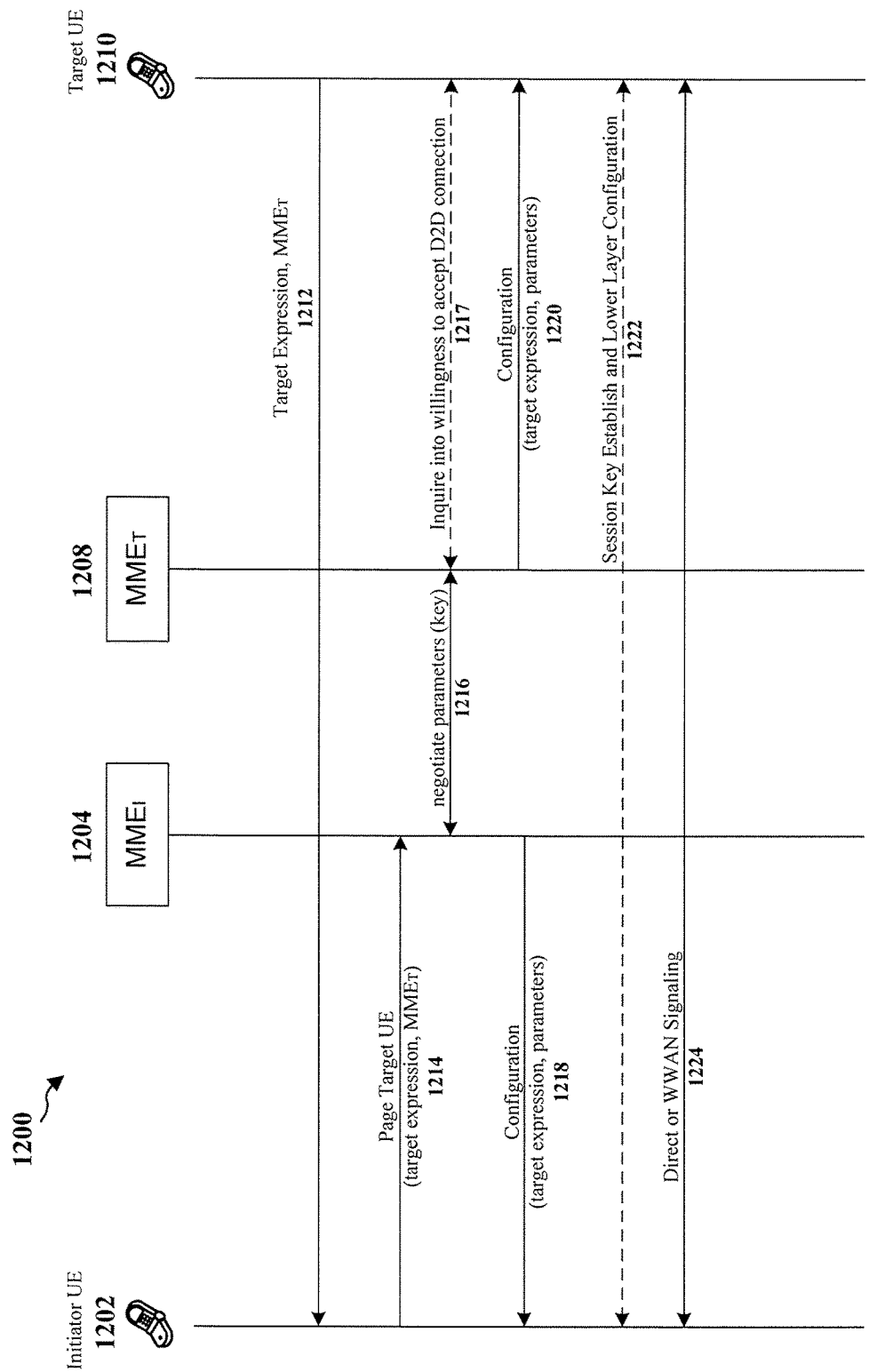
FIG. 12 is a diagram for illustrating a fifth example method.

FIG. 12 is a diagram 1200 for illustrating a fifth example method. As shown in FIG. 12, in act 1212, the target UE 1210 broadcasts its target expression along with information for identifying the MME$_T$ 1208. The initiator UE 1202 receives the broadcast. In act 1214, the initiator UE 1202 pages the target UE 1210 by sending the target expression and the received information for identifying the MME$_T$ 1208 to the MME$_I$ 1204. In act 1216, the MME$_I$ 1204 contacts the MME$_T$ 1208 and negotiates parameters for a session establishment between the UEs 1202, 1210. The parameters may include a key for allowing the UEs 1202, 1210 to communicate securely together. In an optional aspect, at act 1217, MME$_T$ 1208 and target UE 1210 may determine whether the target UE 1210 is willing and/or available to engage in D2D communications with the initiator UE 1202. In such an optional aspect, the call flow may terminate upon a determination that the target UE 1210 is unwilling and/or unavailable for D2D communications. Further, in such an optional aspect, act 1217 may occur before act 1216 is complete, contemporaneously with act 1216 and/or after act 1216 is complete. In act 1218, the MME$_I$ 1204 sends configuration information to the initiator UE 1202. The configuration information includes the negotiated parameters and may further include the target expression. In act 1220, the MME$_T$ 1208 sends configuration information to the target UE 1210. The configuration information includes the negotiated parameters and may further include the target expression. In act 1222, the UEs 1202, 1210 perform session key establishment and lower layer configuration. In act 1224, the UEs 1202, 1210 communicate directly based on the key through peer-to-peer communication. Alternatively, in act 1224, the UEs 1202, 1210 may communicate together based on the key through the WWAN. Further, in an optional aspect, target UE 1210 may indicate an unwillingness and/or an unavailability to the initiator UE 1202 in act 1224. In such an optional aspect, the D2D communications may terminate.

Figure 13:
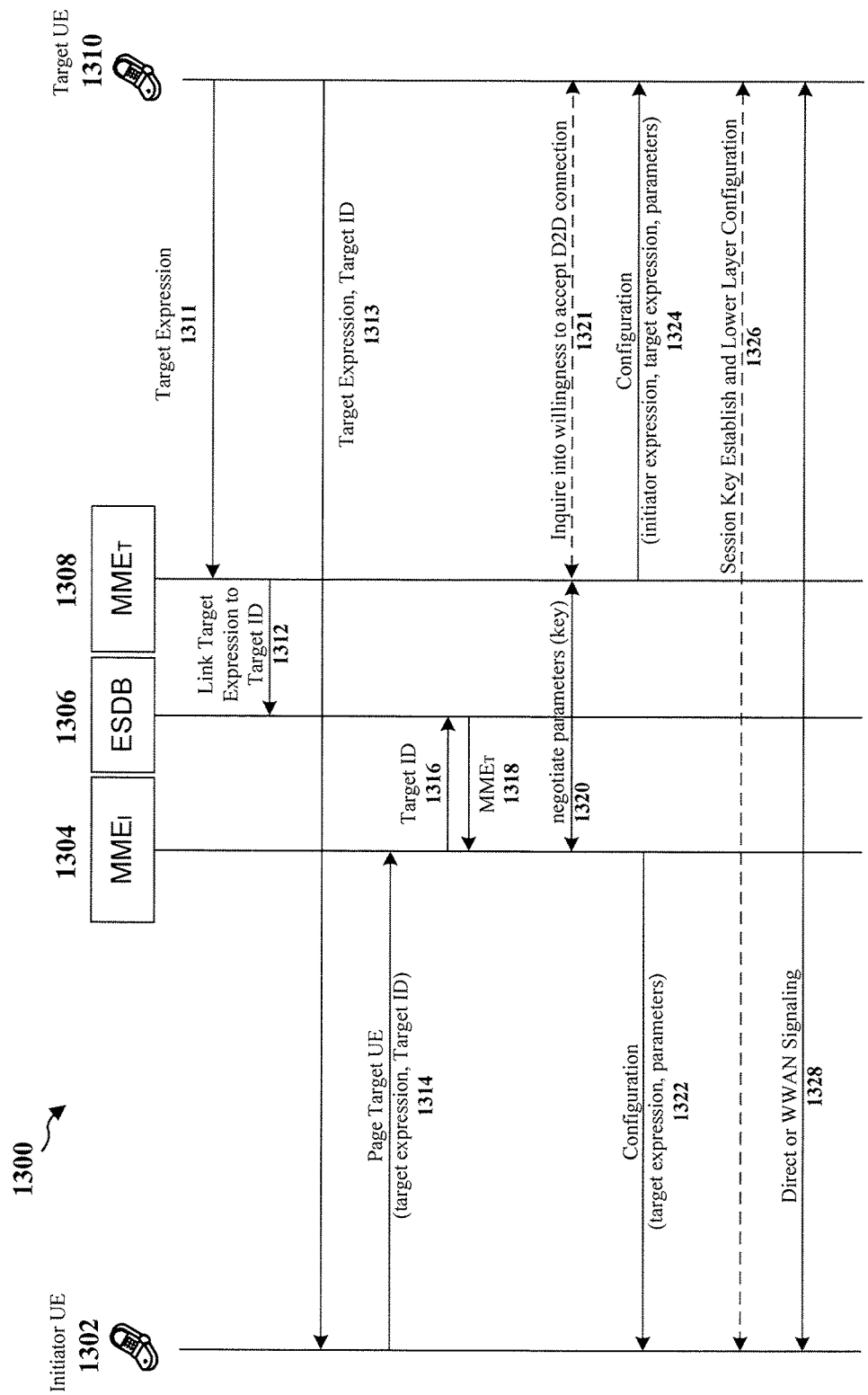
FIG. 13 is a diagram for illustrating a sixth example method.

FIG. 13 is a diagram 1300 for illustrating a sixth example method. As shown in FIG. 13, in act 1311, the target UE 1310 provides its target expression to the MME$_T$ 1308, which is currently serving the target UE 1310. In act 1312, the MMET 1308 communicates with the ESDB 1306 in order to link the target expression to a target identifier (ID).

The target ID is information for identifying the MME$_T$ 1308 serving the target UE 1310. The information for identifying the MME$_T$ 1308 serving the target UE 1310 may be a cell number, a GUTI of the target UE 1310, or a subset of the GUTI (e.g., S-TMSI) of the target UE 1310. In act 1313, the target UE 1310 broadcasts its target expression along with the target ID. The initiator UE 1302 receives the broadcast. In act 1314, the initiator UE 1302 pages the target UE 1310 by sending the target expression and the received target ID to the MME$_I$ 1304. In act 1316, the MME$_I$ 1304 queries the ESDB 1306 with the target ID, and in act 1318, obtains from the ESDB 1306 information identifying the MME$_T$ 1308. In act 1320, the MME$_I$ 1304 contacts the MME$_T$ 1308 and negotiates parameters for a session establishment between the UEs 1302, 1310. In an optional aspect, at act 1321, MME$_T$ 1308 and target UE 1310 may determine whether the target UE 1310 is willing and/or available to engage in D2D communications with the initiator UE 1302. In such an optional aspect, the call flow may terminate upon a determination that the target UE 1310 is unwilling and/or unavailable for D2D communications. Further, in such an optional aspect, act 1321 may occur before act 1320 is complete, contemporaneously with act 1320 and/or after act 1320 is complete. The parameters may include a key for allowing the UEs 1302, 1310 to communicate securely together. In act 1322, the MME$_I$ 1304 sends configuration information to the initiator UE 1302. The configuration information includes the negotiated parameters and may further include the target expression. In act 1324, the MME$_T$ 1308 sends configuration information to the target UE 1310. The configuration information includes the negotiated parameters and may further include the target expression and/or the initiator expression. In act 1326, the UEs 1302, 1310 perform session key establishment and lower layer configuration. In act 1328, the UEs 1302, 1310 communicate directly based on the key through peer-to-peer communication. Alternatively, in act 1328, the UEs 1302, 1310 may communicate together based on the key through the WWAN. Further, in an optional aspect, target UE 1310 may indicate an unwillingness and/or an unavailability to the initiator UE 1302 in act 1328. In such an optional aspect, the D2D communications may terminate.

Figure 14:
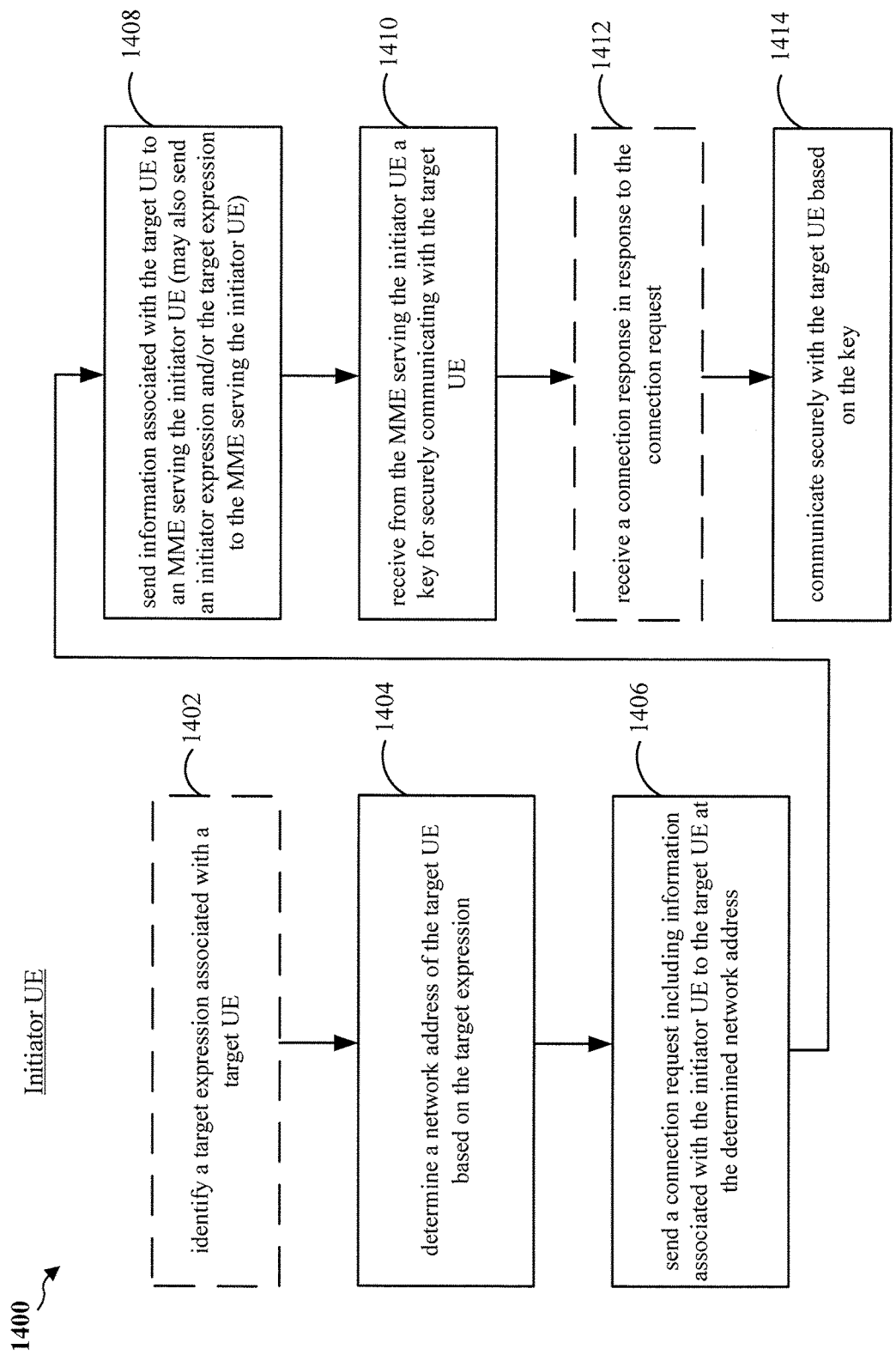
FIG. 14 is a flow chart of a first method of wireless communication.

FIG. 14 is a flow chart 1400 of a first method of wireless communication. The method may be performed by an initiator UE. In an optional aspect, at block 1402, the initiator UE may identify a target expression associated with a target UE. At block 1404, the initiator UE may determine a network address of the target UE based on the target expression. At block 1406, the initiator UE may send a connection request including information associated with the initiator UE to the target UE at the determined network address. At block 1408, the initiator UE may send information associated with the target UE to an MME serving the initiator UE. In an optional aspect, at block 1408, the initiator UE may also send an initiator expression of the initiator UE along with the information to the MME serving the initiator UE. In another optional aspect, at block 1408, the initiator UE may also send the target expression along with the information to the MME serving the initiator UE. At block 1410, the initiator UE receives from the MME serving the initiator UE a key for securely communicating with the target UE. In an optional aspect, at block 1412, the initiator UE receives a connection response in response to the connection request. Block 1412 may alternatively occur after block 1406 and before block 1408. At block 1414, the initiator UE communicates securely with the target UE based on the key.

For example, referring to FIG. 8, the initiator UE 802 identifies a target expression associated with the target UE 810. In act 812, the initiator UE 802 determines a network address of the target UE 810 based on the target expression. In act 814, the initiator UE 802 sends a connection request including information associated with the initiator UE 802 to the target UE 810 at the determined network address. In act 818, the initiator UE 802 sends information associated with the target UE 810 to an MME 804 serving the initiator UE 802. In act 824, the initiator UE 802 receives from the MME 804 serving the initiator UE 802 a key for securely communicating with the target UE 810. In act 828, the initiator UE 802 receives a connection response in response to the connection request. Alternatively, the initiator UE 802 may receive the connection response after sending the connection request in act 814 (e.g., see FIG. 9, acts 914 and 916). In act 834, the initiator UE 802 communicates securely with the target UE 810 based on the key.

The information associated with the initiator UE at block 1406 may include a network address of the initiator UE, an initiator expression of the initiator UE, information identifying the MME serving the initiator UE, etc. The connection request at block 1406 may further include the target expression. At block 1408, the initiator UE may also send an initiator expression of the initiator UE along with the information to the MME serving the initiator UE. At block 1408, the initiator UE may also send the target expression along with the information to the MME serving the initiator UE. The connection response may be received (e.g., block 1412) after the key is received from the MME serving the initiator UE (e.g., block 1410). Alternatively, the connection response may be received (e.g., block 1412) after block 1406 and before block 1408 in which information associated with the target UE is sent to an MME serving the initiator UE. The connection response may include information identifying an MME serving the target UE, an identifier of the target UE, etc. If the connection response is received before the information is sent to the MME serving the initiator UE (e.g., before block 1408), the information associated with the target UE may include information identifying the MME serving the target UE, the identifier of the target UE received in the connection response, etc.

Figure 15:
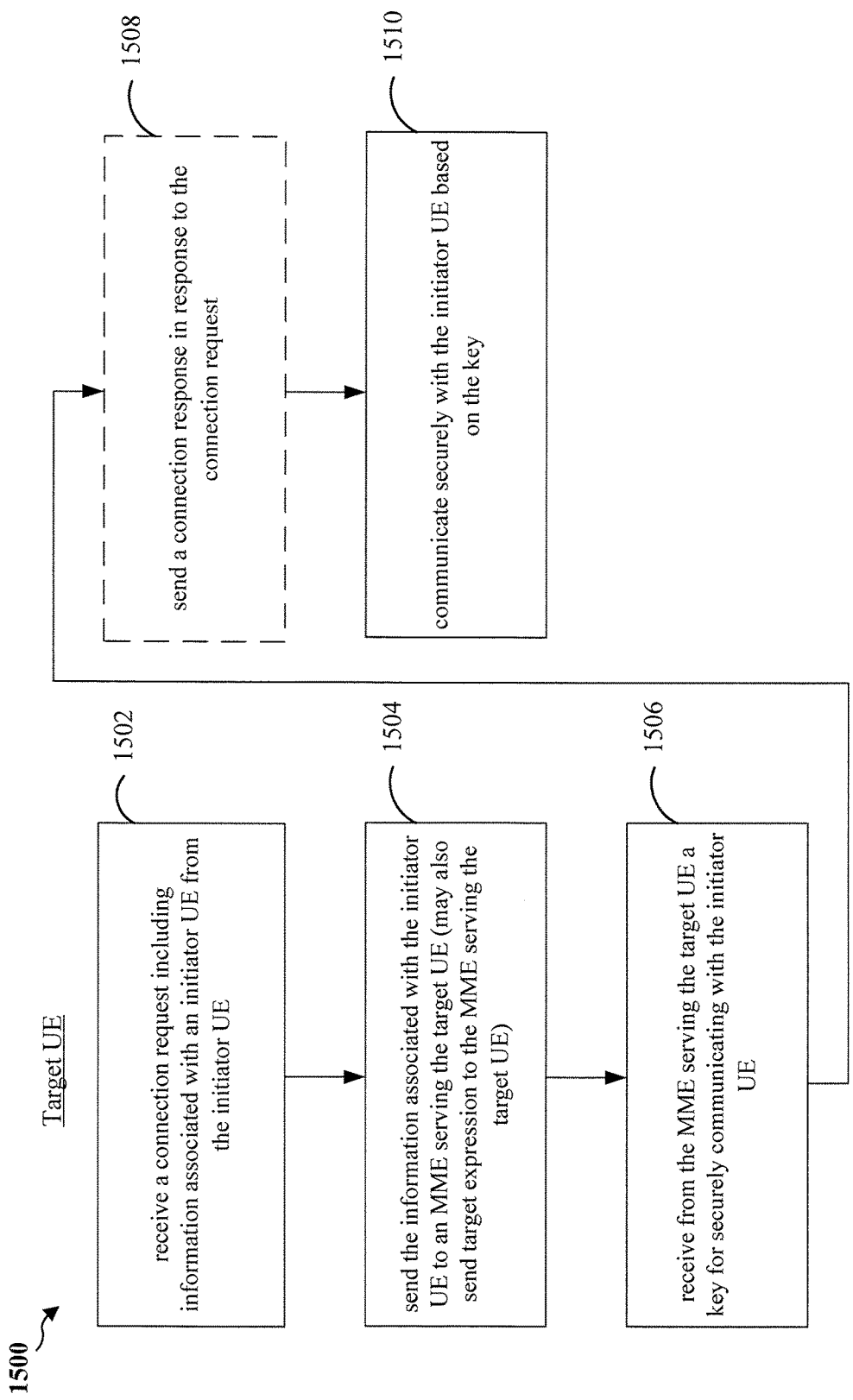
FIG. 15 is a flow chart of a second method of wireless communication.

FIG. 15 is a flow chart 1500 of a second method of wireless communication. The method may be performed by a target UE. At block 1502, the target UE may receive a connection request including information associated with an initiator UE from the initiator UE. At block 1504, the target UE may send the information associated with the initiator UE to an MME serving the target UE. At block 1506, the target UE may receive from the MME serving the target UE a key for securely communicating with the initiator UE. In an optional aspect, at block 1508, the target UE may send a connection response in response to the connection request. In such an optional aspect, the connection response may be sent after the key is received from the MME serving the target UE. In another aspect, block 1508 may alternatively occur after block 1502 and before block 1504. At block 1510, the target UE may communicate securely with the initiator UE based on the key.

For example, referring to FIG. 8, in act 814, the target UE 810 receives a connection request including information associated with an initiator UE 802 from the initiator UE 802. In act 816, the target UE 810 sends the information associated with the initiator UE 802 to an MME 808 serving the target UE 810. In act 826, the target UE 810 receives from the MME 808 serving the target UE 810 a key for securely communicating with the initiator UE 802. In act 828, the target UE 810 sends a connection response in response to the connection request. Act 828 may alternatively occur after act 814 and before act 816 (e.g., see FIG. 9, acts 914 and 916). In act 834, the target UE 810 communicates securely with the initiator UE 802 based on the key.

The information associated with the initiator UE in blocks 1502, 1504 may include an initiator expression of the initiator UE, information identifying an MME serving the initiator UE, etc. The connection request at block 1502 may further include a target expression of the target UE. At block 1504, the target UE may also send a target expression of the target UE along with the information to the MME serving the target UE. The connection response may be sent (e.g., block 1508) after the key is received from the MME serving the target UE (e.g., after block 1508). Alternatively, the connection response may be sent (e.g., block 1508) after block 1502 and before block 1504 in which the information associated with the initiator UE is sent to the MME serving the target UE. The connection response at block 1508 may include information identifying the MME serving the target UE, an identifier of the target UE, etc.

Figure 16:
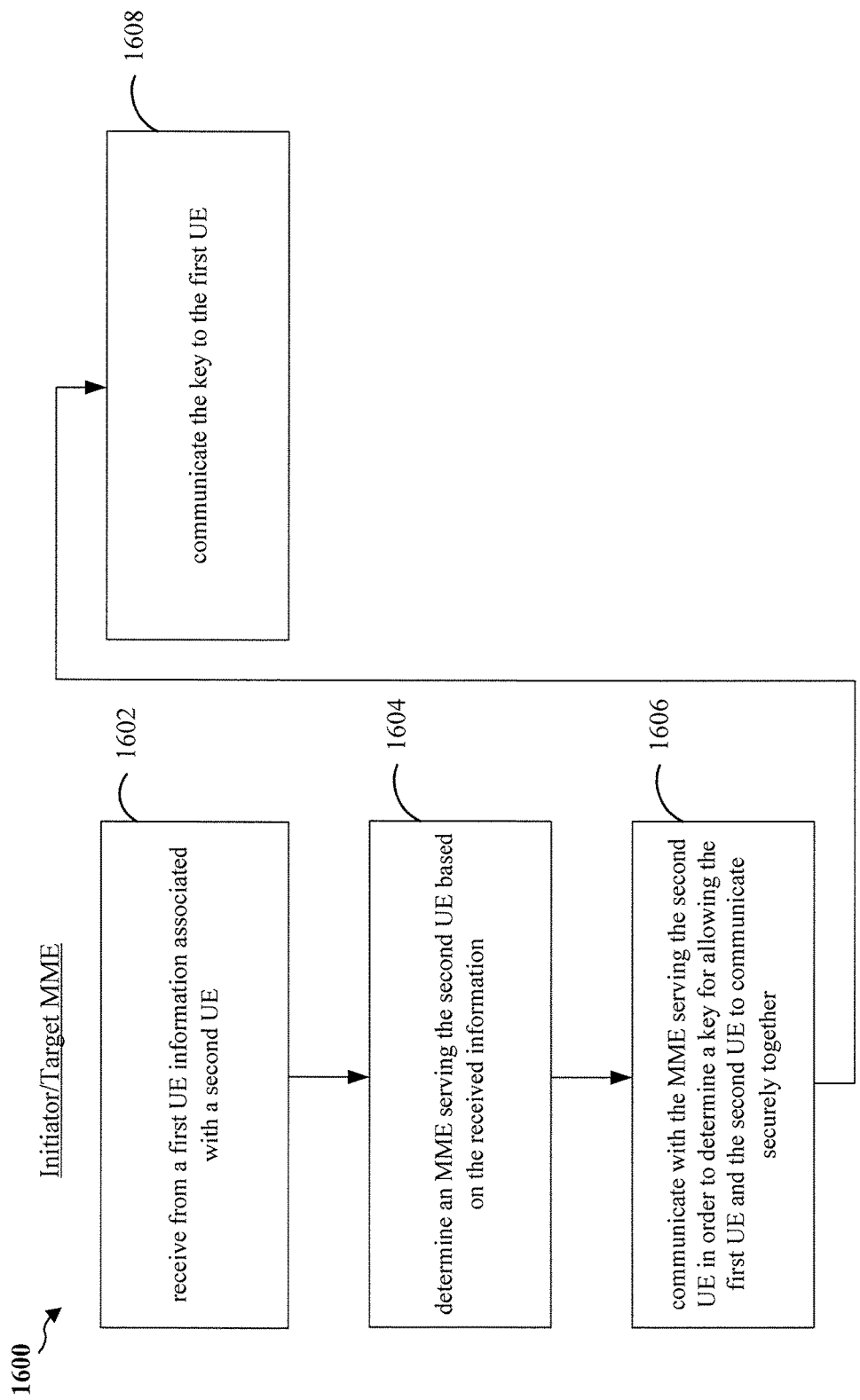
FIG. 16 is a flow chart of a third method of wireless communication.

FIG. 16 is a flow chart 1600 of a third method of communication. The method may be performed by an initiator MME or a target MME serving a first UE. At block 1602, the MME may receive from the first UE information associated with a second UE. The information associated with the second UE may include an expression of the second UE, information identifying the MME serving the second UE, etc. At block 1604, the MME may determine an MME serving the second UE based on the received information. At block 1606, the MME may communicate with the MME serving the second UE in order to determine a key for allowing the first UE and the second UE to communicate securely together. At block 1608, the MME may communicate the key to the first UE.

For example, referring to FIG. 9, assume the method is performed by the initiator MME 904, the first UE is the initiator UE 902, and the second UE is the target UE 910. In act 920, the MME 904 receives from the initiator UE 902 information associated with the target UE 910. The information associated with the target UE 910 may include a target expression of the target UE 910, information identifying the MME 908 serving the target UE 910, etc. The MME 904 determines an MME 908 serving the target UE 910 based on the received information. In act 922, the MME 904 communicates with the MME 908 serving the target UE 910 in order to determine a key for allowing the initiator UE 902 and the target UE 910 to communicate securely together. In act 924, the MME 904 communicates the key to the initiator UE 902.

For another example, referring to FIG. 9, assume the method is performed by the target MME 908, the first UE is the target UE 910, and the second UE is the initiator UE 902. In act 918, the MME 908 receives from the target UE 910 information associated with the initiator UE 902. The information associated with the initiator UE 902 may include an initiator expression of the initiator UE 902, information identifying the MME 904 serving the initiator UE 902, etc. The MME 908 determines an MME 904 serving the initiator UE 902 based on the received information. In act 922, the MME 908 communicates with the MME 904 serving the initiator UE 902 in order to determine a key for allowing the target UE 910 and the initiator UE 902 to communicate securely together. In act 926, the MME 908 communicates the key to the target UE 910.

For yet another example, referring to FIG. 8, assume the method is performed by the target MME 808, the first UE is the target UE 810, and the second UE is the initiator UE 802. In act 816, the MME 808 receives from the target UE 810 information associated with the initiator UE 802. The information associated with the initiator UE 802 may include an initiator expression of the initiator UE 802, information identifying the MME 804 serving the initiator UE 802, etc. The MME 808 determines an MME 804 serving the initiator UE 802 based on the received information. In act 820, the MME 808 communicates with the MME 804 serving the initiator UE 802 in order to determine a key for allowing the target UE 810 and the initiator UE 802 to communicate securely together. In act 826, the MME 808 communicates the key to the target UE 810.

Figure 17:
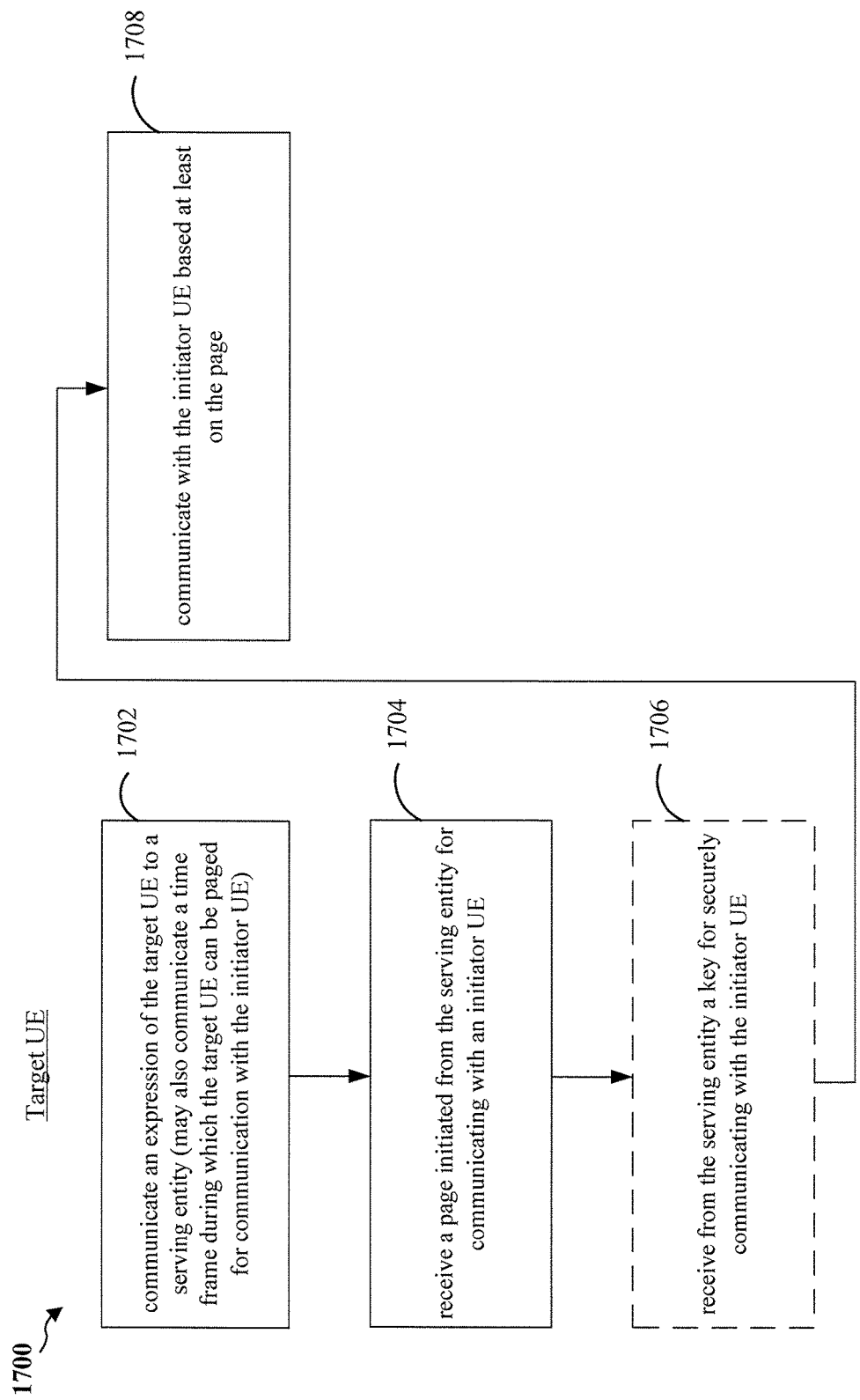
FIG. 17 is a flow chart of a fourth method of wireless communication.

FIG. 17 is a flow chart 1700 of a fourth method of wireless communication. The method may be performed by a target UE. At block 1702, the target UE may communicate an expression of the target UE to a serving entity. In an aspect, the serving entity may be an eNB, a MME common to the target and serving UEs, etc. In an optional aspect, at block 1702, the target UE may also communicate a time frame during which the target UE can be paged for communication with the initiator UE and/or any other initiator UE. At block 1704, the target UE may receive a page initiated from the serving entity for communicating with an initiator UE. The received page may include at least one of a PGID derived from the expression, a GUTI, or a subset of the GUTI (e.g., S-TMSI). The received page may include an identifier associated with the initiator UE and may be scrambled with the DP-RNTI. In an optional aspect, block 1706, the target UE may receive, from the serving entity, a key for securely communicating with the initiator UE. At block 1708, the target UE communicates with the initiator UE based at least on the page. In an aspect in which the UE receives the key, the target UE may further communicate with the initiator UE in a secure manner based on the key.

For example, referring to FIG. 11, in act 1112, the target UE 1110 communicates an expression of the target UE 1110 to a serving entity 1104. In act 1116, the target UE 1110 receives a page initiated from the serving entity 1104 for communicating with an initiator UE 1102. In act 1118, the target UE 1110 receives from the serving entity 1104 a key for securely communicating with the initiator UE 1102. In act 1124, the target UE 1110 communicates securely with the initiator UE 1102 based on the key.

Figure 18:
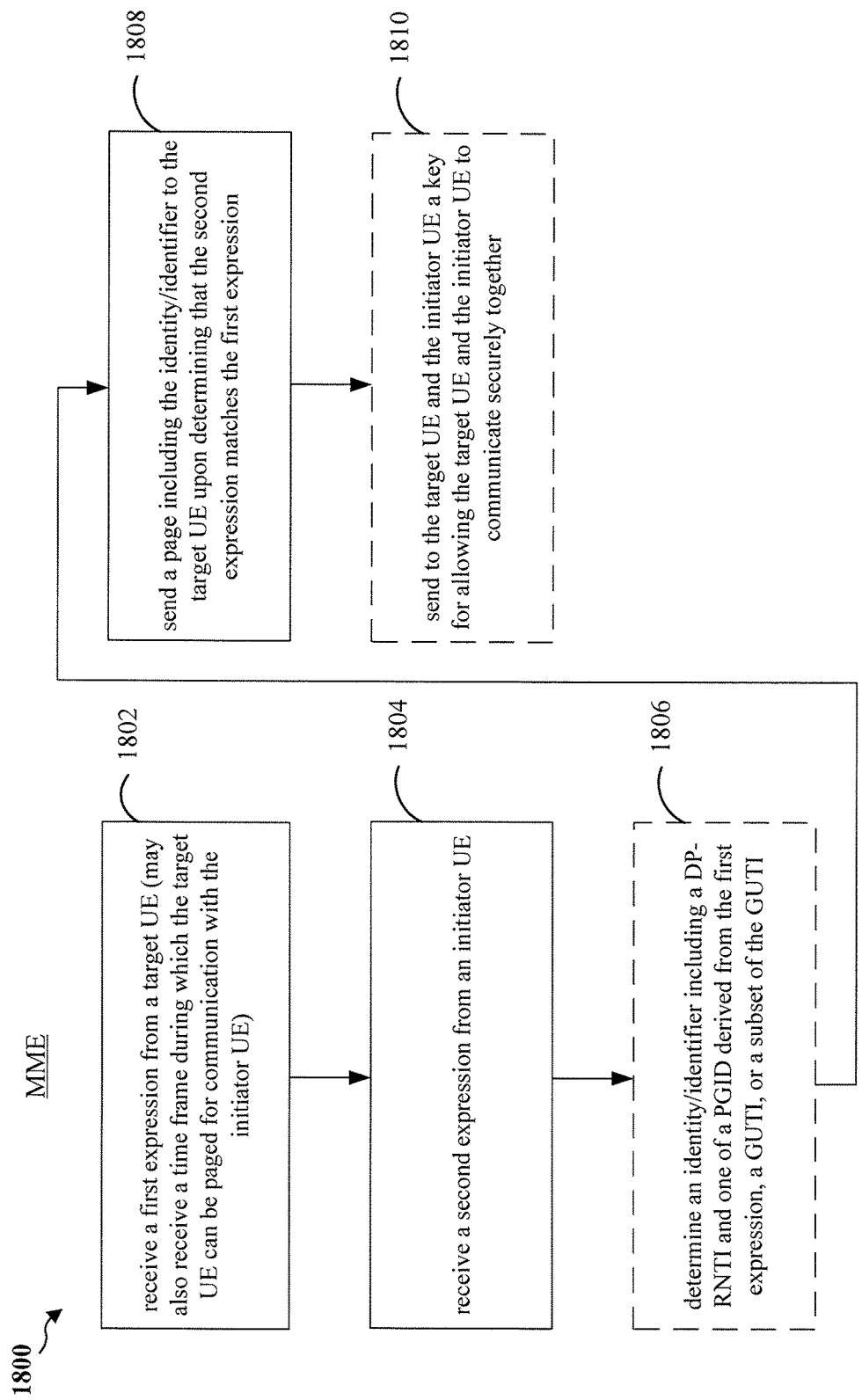
FIG. 18 is a flow chart of a fifth method of wireless communication.

FIG. 18 is a flow chart 1800 of a fifth method of communication. The method may be performed by a serving entity, such as an eNB an MME, etc. At block 1802, the serving entity may receive a first expression from a target UE. In an optional aspect, at block 1802, the serving entity may also receive a time frame during which the target UE can be paged for communication with the initiator UE and/or any other initiator UEs. At block 1804, the serving entity may receive a second expression from an initiator UE. In an optional aspect, at block 1806, the serving entity may determine an identity/identifier including a PGID derived from the expression, a GUTI, a subset of the GUTI (e.g., S-TMSI), etc. At block 1808, the serving entity may send a page including the identity/identifier to the target UE upon determining that the second expression matches the first expression. The page may include an identifier associated with the initiator UE. In an aspect, the serving entity may send the page upon a determination that a current time is within the received time frame. In an optional aspect, at block 1810, the serving entity may send, to the target UE and the initiator UE, a key for allowing the target UE and the initiator UE to communicate securely together.

For example, referring to FIG. 11, in act 1112, the serving entity 1104 receives a first expression from a target UE 1110. In act 1114, the serving entity 1104 receives a second expression from an initiator UE 1102. The serving entity 1104 determines an identity/identifier including a PGID derived from the first expression, a GUTI, or a subset of the GUTI (e.g., S-TMSI). In act 1116, the serving entity 1104 sends a page including the identity/identifier to the target UE 1110 upon determining that the second expression matches the first expression. In acts 1118, 1120 the serving entity 1104 sends to the target UE 1110 and the initiator UE 1102, respectively, a key for allowing the target UE 1110 and the initiator UE 1102 to communicate securely together.

Figure 19:
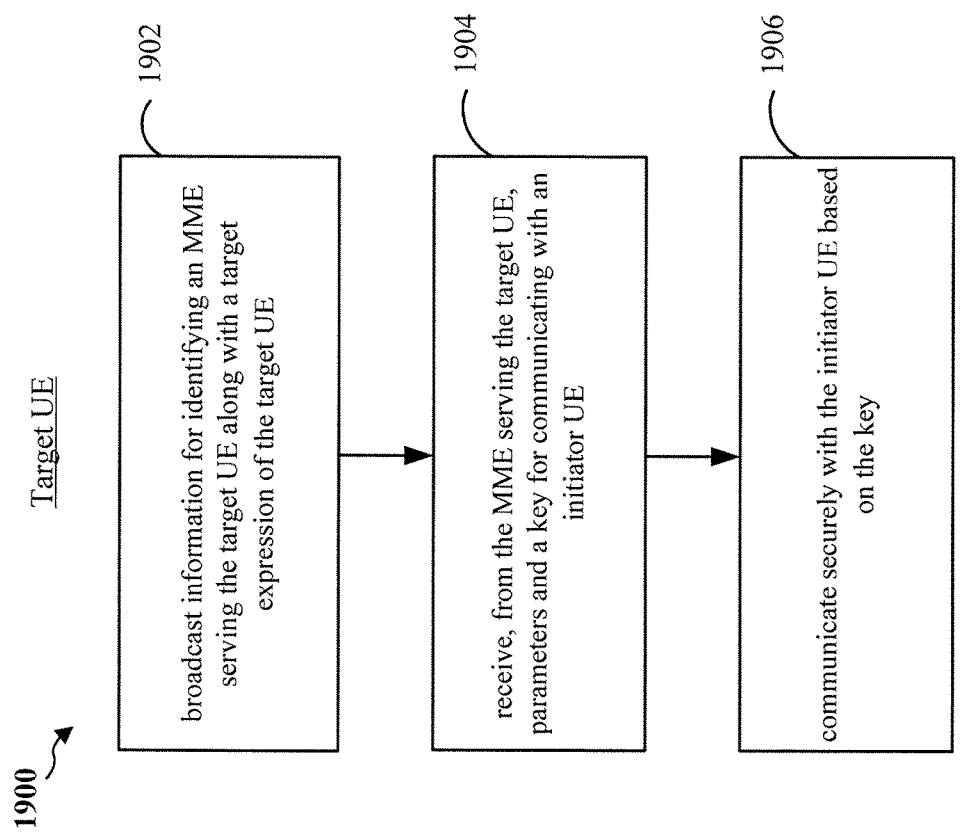
FIG. 19 is a flow chart of a sixth method of wireless communication.

FIG. 19 is a flow chart 1900 of a sixth method of wireless communication. The method may be performed by a target UE. At block 1902, the target UE may broadcast information for identifying an MME serving the target UE along with a target expression of the target UE. At block 1904, the target UE receives, from the MME serving the target UE, parameters and a key for communicating with an initiator UE. In an aspect, the key may be for communicating directly with the initiator UE. In another aspect, the parameters may further facilitate the direct communications with the initiator UE through providing various configuration values, etc. At block 1906, the target UE communicates securely with the initiator UE based on the key.

For example, referring to FIG. 12, in act 1212, the target UE 1210 broadcasts information for identifying an MME 1208 serving the target UE 1210 along with a target expression of the target UE 1210. In act 1220, the target UE 1210 receives from the MME 1208 serving the target UE 1210 a key for communicating with an initiator UE 1202. In act 1224, the target UE 1210 communicates securely with the initiator UE 1202 based on the key.

For another example, referring to FIG. 13, in act 1313, the target UE 1310 broadcasts information for identifying an MME 1308 serving the target UE 1310 along with a target expression of the target UE 1310. In act 1324, the target UE 1310 receives from the MME 1308 serving the target UE 1310 a key for communicating with an initiator UE 1302. In act 1328, the target UE 1310 communicates securely with the initiator UE 1302 based on the key.

Figure 20:
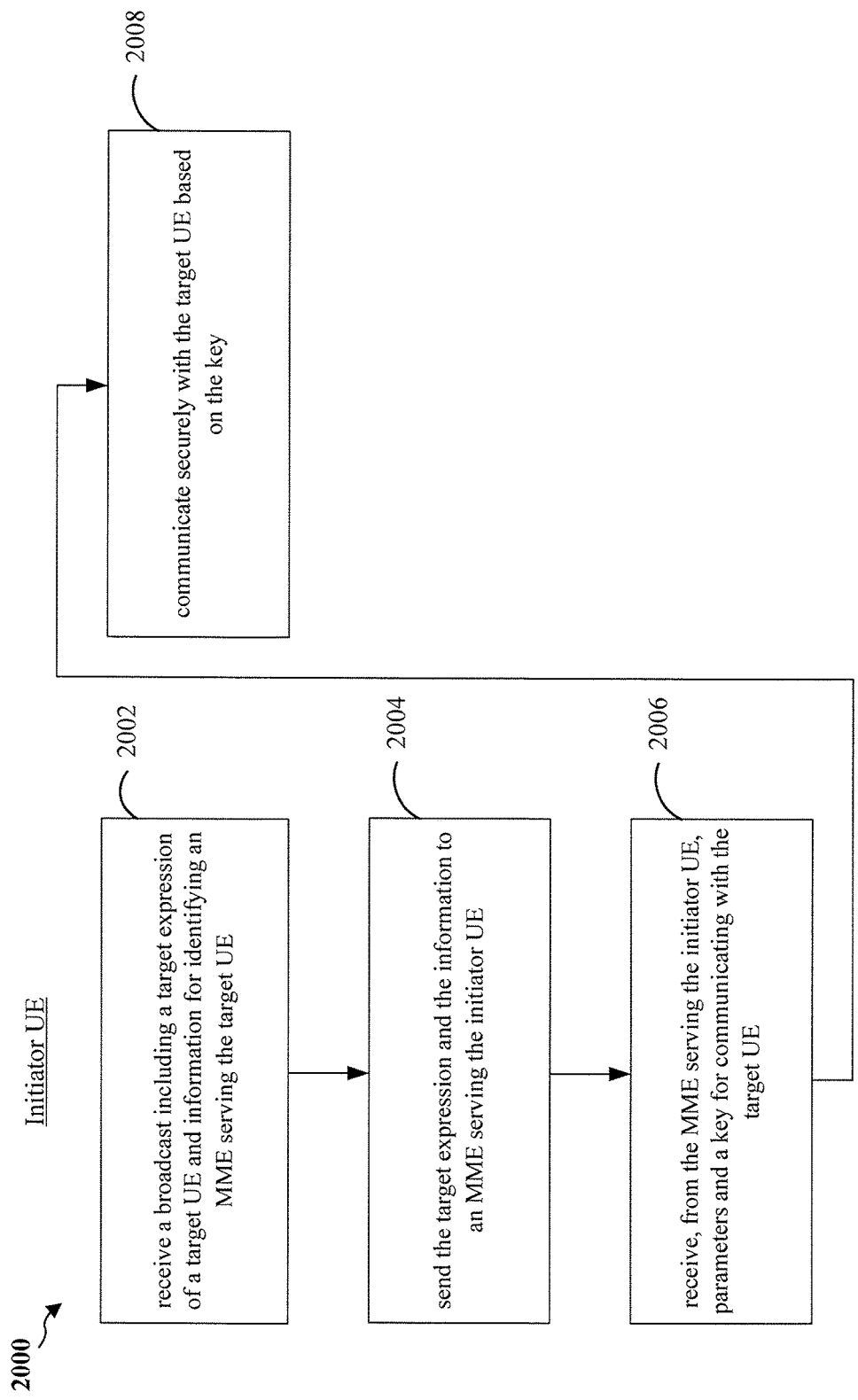
FIG. 20 is a flow chart of a seventh method of wireless communication.

FIG. 20 is a flow chart 2000 of a seventh method of wireless communication. The method may be performed by an initiator UE. At block 2002, the initiator UE may receive a broadcast including a target expression of a target UE and information for identifying an MME serving the target UE. At block 2004, the initiator UE may send the target expression and the information to an MME serving the initiator UE. At block 2006, the initiator UE may receive, from the MME serving the initiator UE, parameters and a key for communicating with the target UE. In an aspect, the key may be for communicating directly with the target UE. In another aspect, the parameters may further facilitate the direct communications with the initiator UE through providing various configuration values, etc. At block 2008, the initiator UE may communicate securely with the target UE based on the key.

For example, referring to FIG. 12, in act 1212, the initiator UE 1202 receives a broadcast including a target expression of a target UE 1210 and information for identifying an MME 1208 serving the target UE 1210. In act 1214, the initiator UE 1202 sends the target expression and the information to an MME 1204 serving the initiator UE 1202. In act 1218, the initiator UE 1202 receives from the MME 1204 serving the initiator UE 1202 a key for communicating with the target UE 1210. In act 1224, the initiator UE 1202 communicates securely with the target UE 1210 based on the key.

For another example, referring to FIG. 13, in act 1313, the initiator UE 1302 receives a broadcast including a target expression of a target UE 1310 and information for identifying an MME 1308 serving the target UE 1310. In act 1314, the initiator UE 1302 sends the target expression and the information to an MME 1304 serving the initiator UE 1302. In act 1322, the initiator UE 1302 receives from the MME 1304 serving the initiator UE 1302 a key for communicating with the target UE 1310. In act 1328, the initiator UE 1302 communicates securely with the target UE 1310 based on the key.

Figure 21:
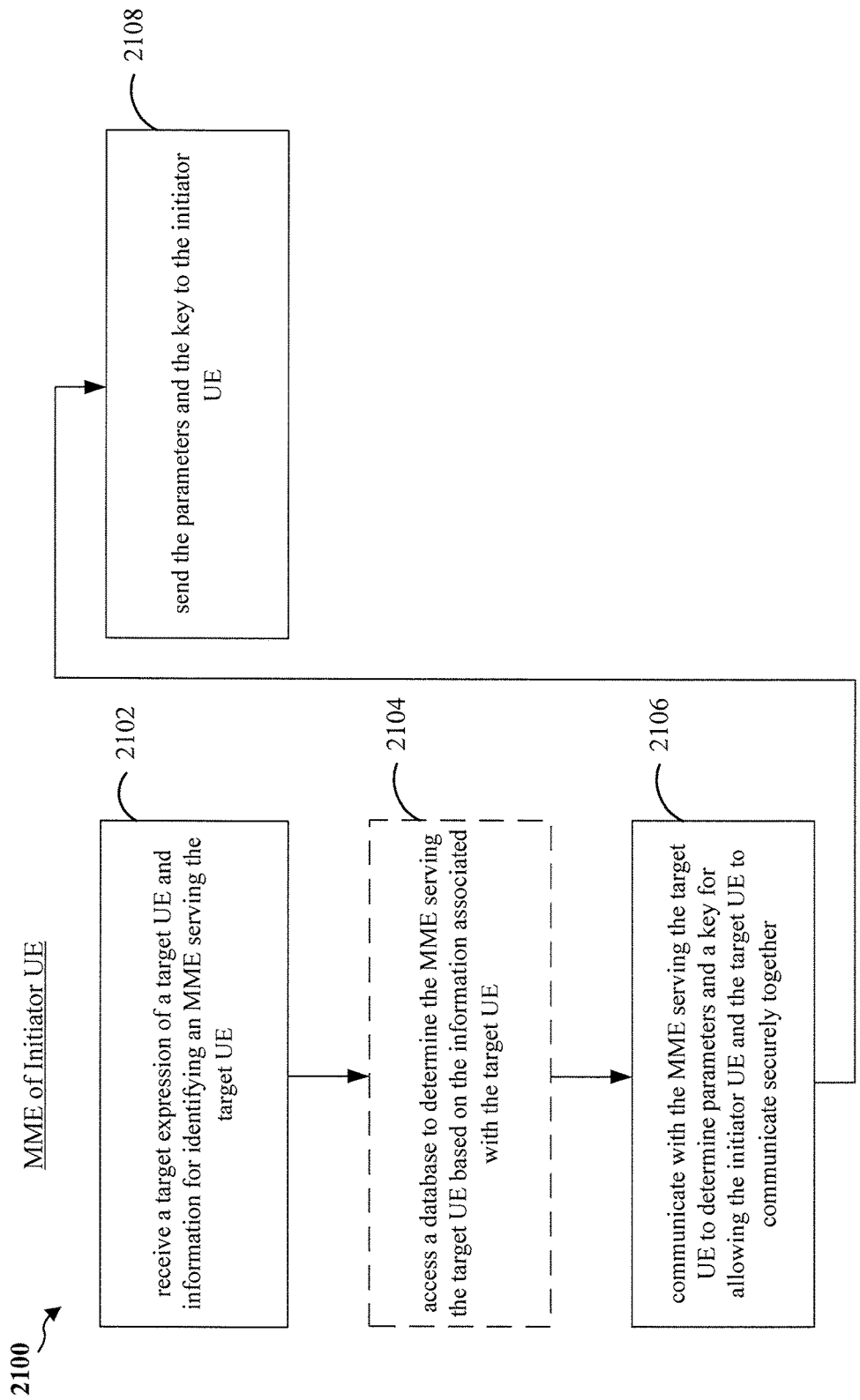
FIG. 21 is a flow chart of an eighth method of wireless communication.

FIG. 21 is a flow chart 2100 of an eighth method of communication. The method may be performed by an MME of an initiator UE. At block 2102, the MME may receive a target expression of a target UE and information for identifying an MME serving the target UE. The information for identifying the MME serving the target UE may be an identifier of the MME serving the target UE, information associated with the target UE (e.g., cell number, GUTI, subset of GUTI), etc. In an optional aspect, at block 2104, the MME may access a database to determine the MME serving the target UE based on the information associated with the target UE. At block 2106, the MME may communicate with the MME serving the target UE to determine parameters and a key for allowing the initiator UE and the target UE to communicate securely together. At block 2108, the MME may send the parameters and the key to the initiator UE.

For example, referring to FIG. 12, in act 1214, the MME 1204 receives a target expression of a target UE 1210 and information for identifying an MME 1208 serving the target UE 1210. The information for identifying the MME 1208 serving the target UE 1210 may be an identifier of the MME 1208 serving the target UE 1210. In act 1216, the MME 1204 communicates with the MME 1208 serving the target UE 1210 to determine a key for allowing the initiator UE 1202 and the target UE 1210 to communicate securely together. In act 1218, the MME 1204 sends the key to the initiator UE 1202.

For another example, referring to FIG. 13, in act 1314, the MME 1304 receives a target expression of a target UE 1310 and information for identifying an MME 1308 serving the target UE 1310. The information for identifying the MME 1308 serving the target UE 1310 may be information associated with the target UE (e.g., target ID). In acts 1316 and 1318, the MME 1304 may access a database to determine the MME 1308 serving the target UE 1310 based on the information associated with the target UE 1310. In act 1320, the MME 1304 communicates with the MME 1308 serving the target UE 1310 to determine a key for allowing the initiator UE 1302 and the target UE 1310 to communicate securely together. In act 1322, the MME 1304 sends the key to the initiator UE 1302.

Figure 22:
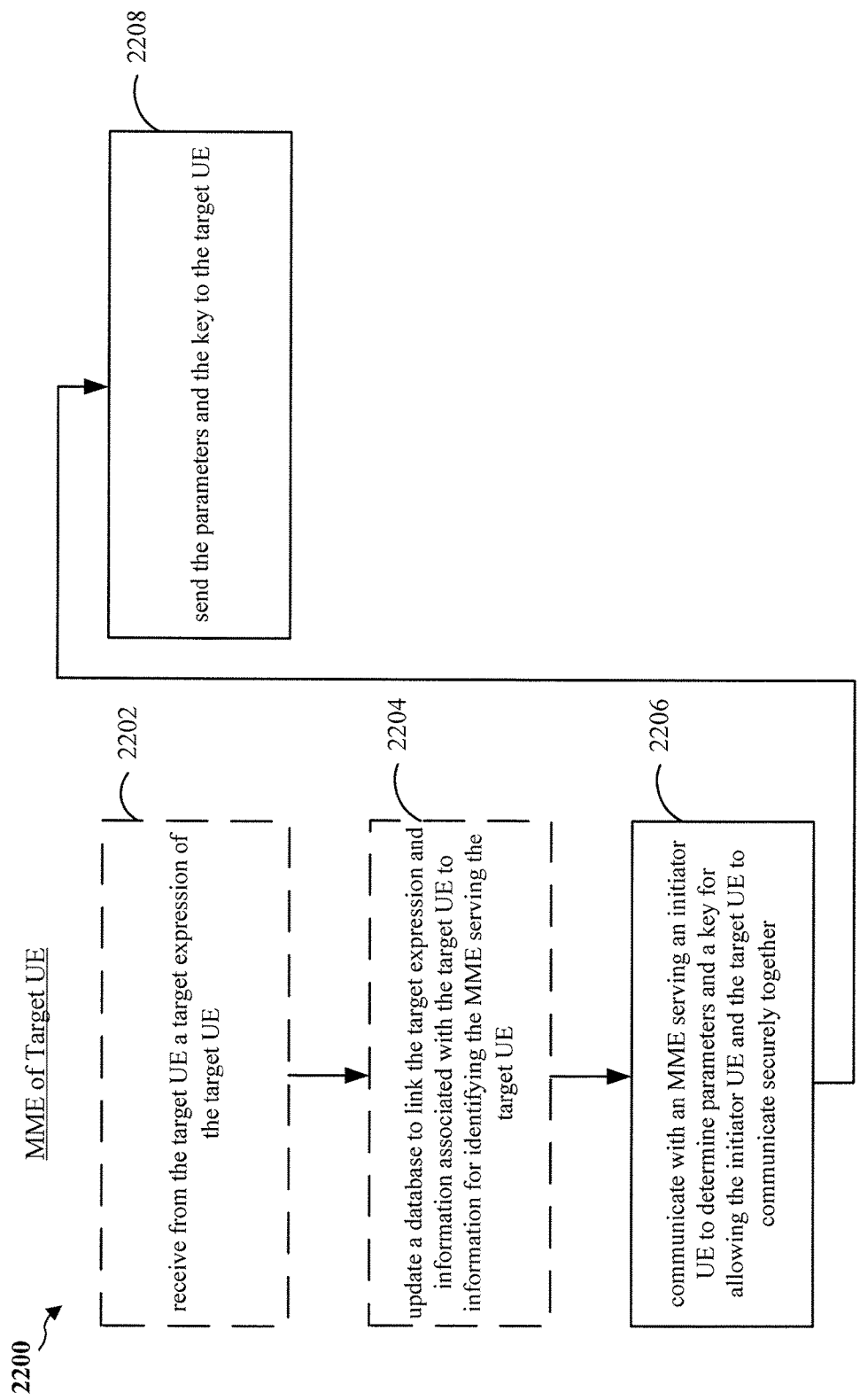
FIG. 22 is a flow chart of a ninth method of wireless communication.

FIG. 22 is a flow chart 2200 of a ninth method of communication. The method may be performed by an MME of a target UE. In an optional aspect, at block 2202, the MME may receive from the target UE a target expression of the target UE. In a further optional aspect, at block 2204, the MME may update a database to link the target expression and information associated with the target UE to information for identifying the MME serving the target UE. The information associated with the target UE may be a PGID, a GUTI, a subset of the GUTI (e.g., S-TMSI), a cell number, etc. At block 2206, the MME may communicate with an MME serving an initiator UE to determine parameters and a key for allowing the initiator UE and the target UE to communicate securely together. At block 2208, the MME may send the parameters and key to the target UE.

For example, referring to FIG. 12, in act 1216, the MME 1208 communicates with an MME 1204 serving an initiator UE 1202 to determine a key for allowing the initiator UE 1202 and the target UE 1210 to communicate securely together. In act 1220, the MME 1208 sends the key to the target UE 1210. For another example, referring to FIG. 13, in act 1311, the MME 1308 receives from the target UE 1310 a target expression of the target UE 1310. In act 1312, the MME 1308 updates a database in the ESDB 1306 to link the target expression and information (e.g., target ID) associated with the target UE 1310 to information for identifying the MME 1308 serving the target UE 1310. The information associated with the target UE 1310 may be a GUTI, a subset of the GUTI (e.g., S-TMSI), a cell number of the target UE 1310, etc. In act 1320, the MME 1308 communicates with an MME 1304 serving an initiator UE 1302 to determine a key for allowing the initiator UE 1302 and the target UE 1310 to communicate securely together. In act 1324, the MME 1308 sends the key to the target UE 1310.

Figure 23:
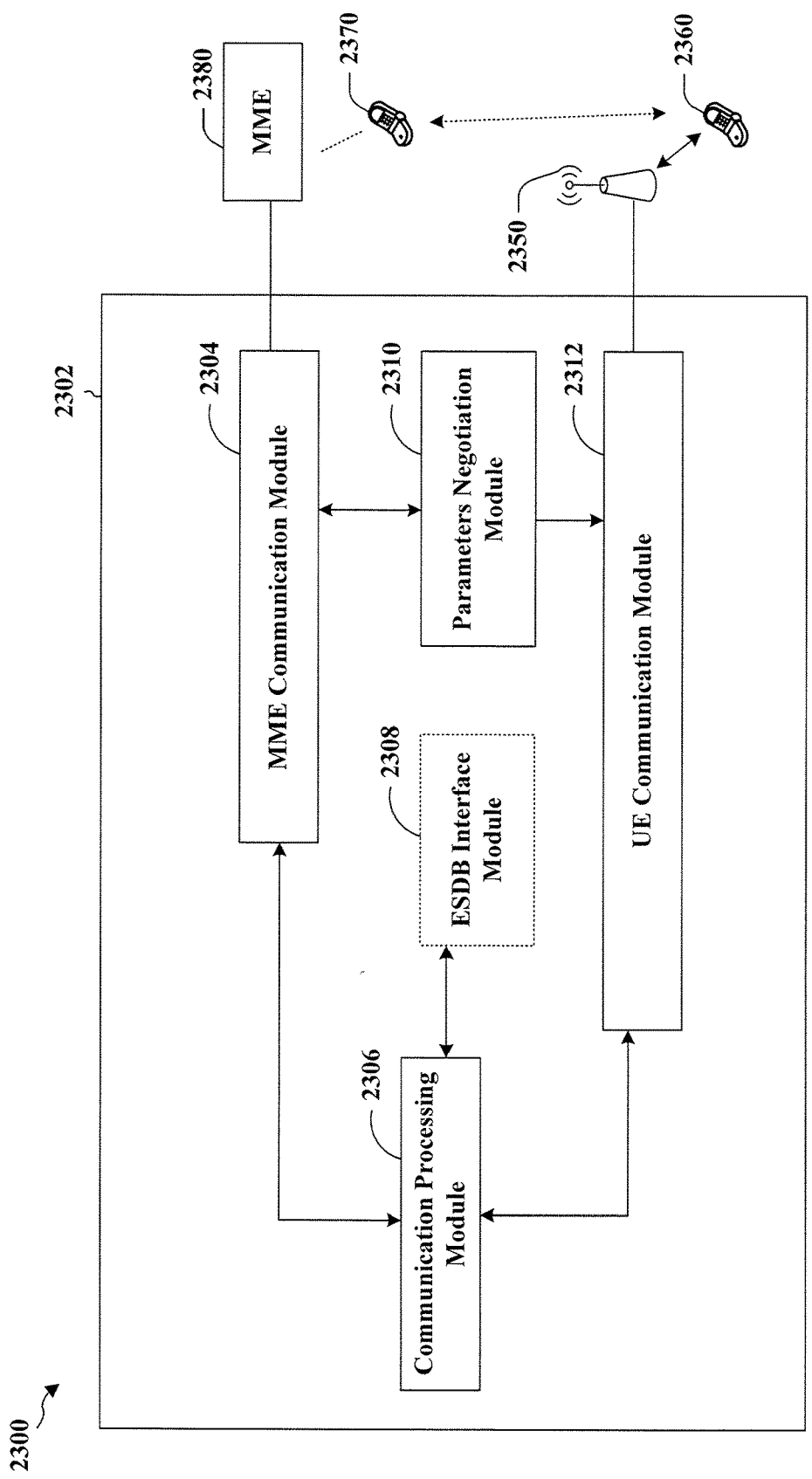
FIG. 23 is a conceptual data flow diagram illustrating the data flow between different modules/means/components in an example MME apparatus.

FIG. 23 is a conceptual data flow diagram 2300 illustrating the data flow between different modules/means/components in an example apparatus 2302. In a first configuration, the apparatus 2302 may be an MME that is serving a first UE 2360. In such a configuration, the apparatus may include a UE communication module 2312 that is configured to receive from the first UE 2360 via the eNB 2350 information associated with a second UE 2370. The received information is provided to a communication processing module 2306, which provides the information to a DNS interface module 2308. The ESDB interface module 2308 that is configured to determine an MME 2380 serving the second UE 2370 based on the received information. The communication processing module 2306 informs the MME communication module 2304 of the determined MME 2380. The MME communication module 2304 is configured to communicate with the MME 2380 serving the second UE 2370 in order to determine a key for allowing the first UE 2360 and the second UE 2370 to communicate securely together. The MME communication module 2304 communicates with the parameters negotiation module 2310 to determine the key. The parameters negotiation module 2310 provides the key to the UE communication module 2312, which communicates the key to the first UE 2360.

The apparatus may include additional modules that perform each of the blocks of the algorithm in the aforementioned flow chart of FIG. 16. As such, each step in the aforementioned flow chart of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a second configuration, the apparatus 2302 may be an MME that is serving an initiator UE 2360. In such a configuration, the apparatus 2302 may include a UE communication module 2312 that is configured to receive a target expression of a target UE 2370 from the initiator UE 2360 via the eNB 2350. The UE communication module 2312 is further configured to receive information for identifying an MME 2380 serving the target UE 2370. The UE communication module 2312 provides the received information to the communication processing module 2306. If the apparatus needs to determine an MME 2380 serving the target UE 2370, the communication processing module 2306 is configured to communicate with the ESDB interface module 2308, which is configured to determine the MME 2380 serving the target UE 2370 based on the information associated with the target UE 2370. The apparatus further includes an MME communication module 2304 that is configured to communicate with the MME 2380 serving the target UE 2370 to determine a key for allowing the initiator UE 2360 and the target UE 2370 to communicate securely together. The key is determined by the parameters negotiation module 2310, which provides the key to the UE communication module 2312. The UE communication module 2312 is configured to send the key to the initiator UE 2360.

The apparatus may include additional modules that perform each of the blocks of the algorithm in the aforementioned flow chart of FIG. 21. As such, each step in the aforementioned flow chart of FIG. 21 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a third configuration, the apparatus 2302 may be an MME that is serving a target UE 2360. In such a configuration, the apparatus 2302 includes an MME communication module 2304 that is configured to communicate with an MME 2380 serving an initiator UE 2370 to determine a key for allowing the initiator UE 2370 and the target UE 2360 to communicate securely together. The key is determined by a parameters negotiation module 2310, which provides the key to the UE communication module 2312. The UE communication module 2312 is configured to send the key to the target UE 2360 via the eNB 2350. The UE communication module 2312 may be further configured to receive from the target UE 2360 a target expression of the target UE 2360. The UE communication module 2312 is configured to provide the target expression to the communication processing module 2306, which is configured to communicate with the ESDB interface module 2308 in order to update a database to link the target expression and information associated with the target UE 2360 to information for identifying the MME 2302 serving the target UE 2360.

The apparatus may include additional modules that perform each of the blocks of the algorithm in the aforementioned flow chart of FIG. 22. As such, each step in the aforementioned flow chart of FIG. 22 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 24:
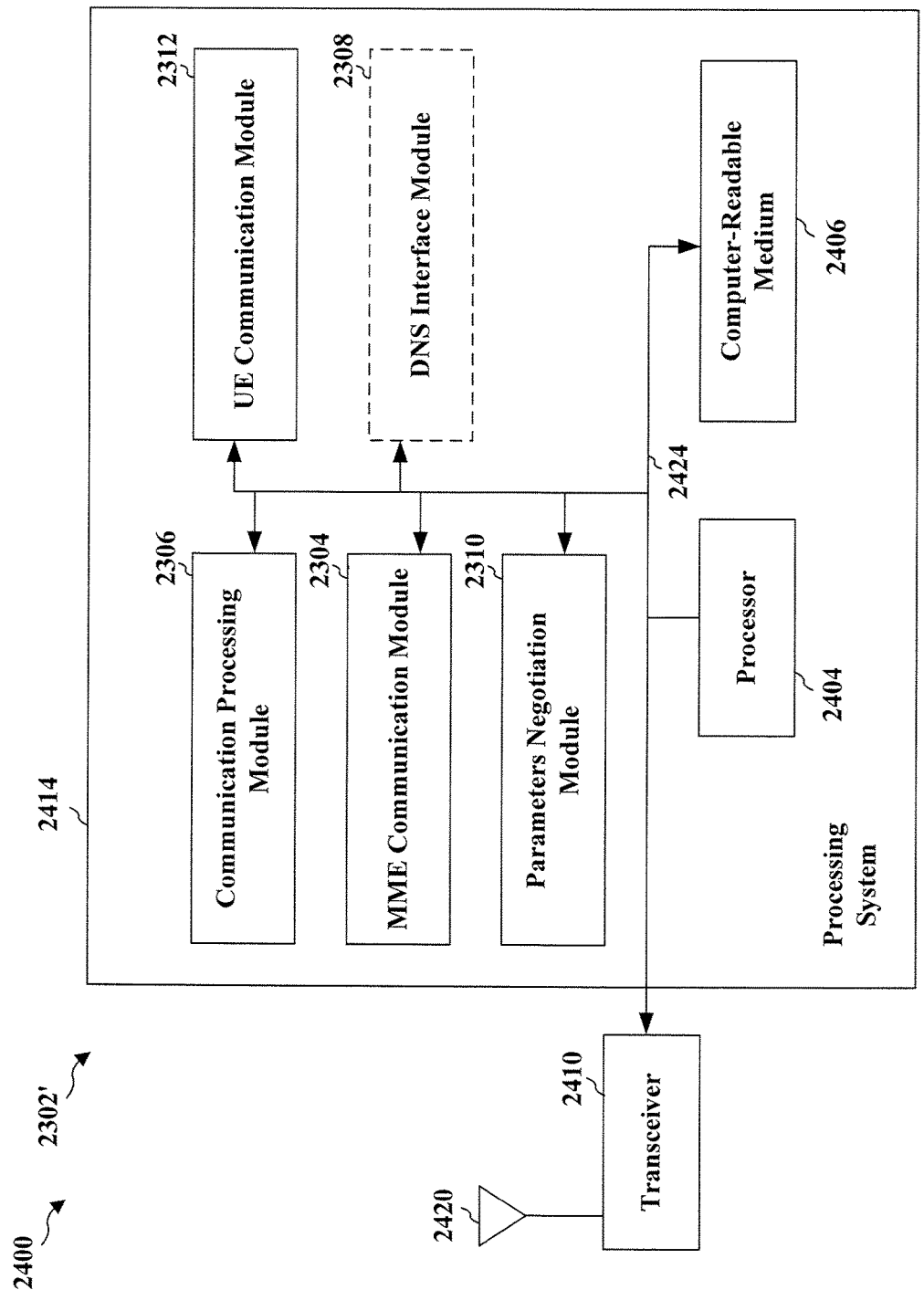
FIG. 24 is a diagram illustrating an example of a hardware implementation for an MME apparatus employing a processing system.

FIG. 24 is a diagram illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware modules, represented by the processor 2404, the modules 2304, 2306, 2308, 2310, 2312, and the computer-readable medium 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The processing system 2414 includes a processor 2404 coupled to a computer-readable medium 2406. The processor 2404 is responsible for general processing, including the execution of software stored on the computer-readable medium 2406. The software, when executed by the processor 2404, causes the processing system 2414 to perform the various functions described supra for any particular apparatus. The computer-readable medium 2406 may also be used for storing data that is manipulated by the processor 2404 when executing software. The processing system further includes at least one of the modules 2304, 2306, 2308, 2310, 2312. The modules may be software modules running in the processor 2404, resident/stored in the computer readable medium 2406, one or more hardware modules coupled to the processor 2404, or some combination thereof.

In one configuration, the apparatus 2302/2302' for wireless communication includes means for receiving from the first UE information associated with a second UE, means for determining an MME serving the second UE based on the received information, means for communicating with the MME serving the second UE in order to determine a key for allowing the first UE and the second UE to communicate securely together, and means for communicating the key to the first UE. The aforementioned means may be one or more of the aforementioned modules of the apparatus 2302 and/or the processing system 2414 of the apparatus 2302' configured to perform the functions recited by the aforementioned means.

In another configuration, the apparatus 2302/2302' for wireless communication includes means for receiving a target expression of a target UE and information for identifying an MME serving the target UE, means for communicating with the MME serving the target UE to determine a key for allowing the initiator UE and the target UE to communicate securely together, and means for sending the key to the initiator UE. The apparatus may further include means for accessing a database to determine the MME serving the target UE based on the information associated with the target UE. The aforementioned means may be one or more of the aforementioned modules of the apparatus 2302 and/or the processing system 2414 of the apparatus 2302' configured to perform the functions recited by the aforementioned means.

In another configuration, the apparatus 2302/2302' for wireless communication includes means for communicating with an MME serving an initiator UE to determine a key for allowing the initiator UE and the target UE to communicate securely together, and means for sending the key to the target UE. The apparatus may further include means for receiving from the target UE a target expression of the target UE, and means for updating a database to link the target expression and information associated with the target UE to information for identifying the MME serving the target UE. The aforementioned means may be one or more of the aforementioned modules of the apparatus 2302 and/or the processing system 2414 of the apparatus 2302' configured to perform the functions recited by the aforementioned means.

Figure 25:
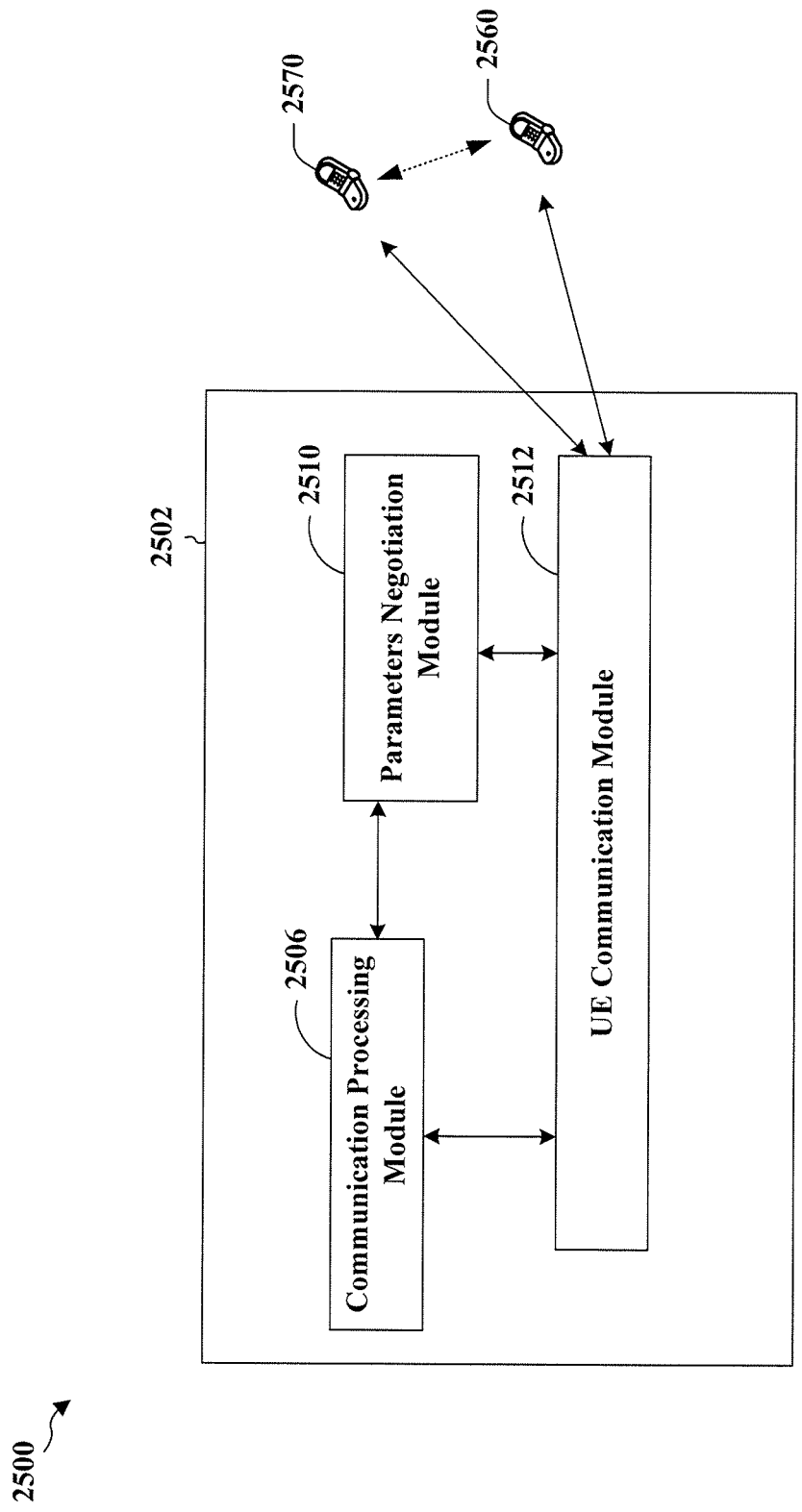
FIG. 25 is a conceptual data flow diagram illustrating the data flow between different modules/means/components in an example serving entity apparatus.

FIG. 25 is a conceptual data flow diagram 2500 illustrating the data flow between different modules/means/components in an example apparatus 2502. The apparatus 2502 may be a serving entity and may be either an MME or an eNB. The apparatus includes a UE communication module 2512 that is configured to receive a first expression from a target UE 2560. The UE communication module 2512 is further configured to receive a second expression from an initiator UE 2570. The communication processing module 2506 is configured to determine whether the second expression matches the first expression. When the expressions match, the UE communication module 2512 is configured to send a page to the target UE 2560. The UE communication module 2512 may be further configured to receive a time frame during which the target UE 2560 can be paged for communication. The communication processing module 2506 may be configured to determine whether a current time is within the received time frame, and upon determining that a current time is within the received time frame, to inform the UE communication module 2512 to send the page. The communication processing module 2506 may be further configured to determine an identity/identifier including a PGID derived from the first expression, a GUTI, a subset of the GUTI, etc. The communication processing module 2506 is configured to provide the identity/identifier to the UE communication module 2512, which is configured to include the identity/identifier in the page. The communication processing module 2506 may be further configured to provide an identifier associated with the initiator UE 2570 to the UE communication module 2512, which is configured to include the identifier associated with the initiator UE 2570 in the page. The apparatus may further include a parameters negotiation module 2510, which is configured to determine a key for allowing the target UE 2560 and the initiator UE 2570 to communicate securely together. The parameters negotiation module 2510 is configured to provide the key to the UE communication module 2512, which is configured to send the key to both the target UE 2560 and the initiator UE 2570.

The apparatus may include additional modules that perform each of the blocks of the algorithm in the aforementioned flow chart of FIG. 18. As such, each step in the aforementioned flow chart of FIG. 18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 26:
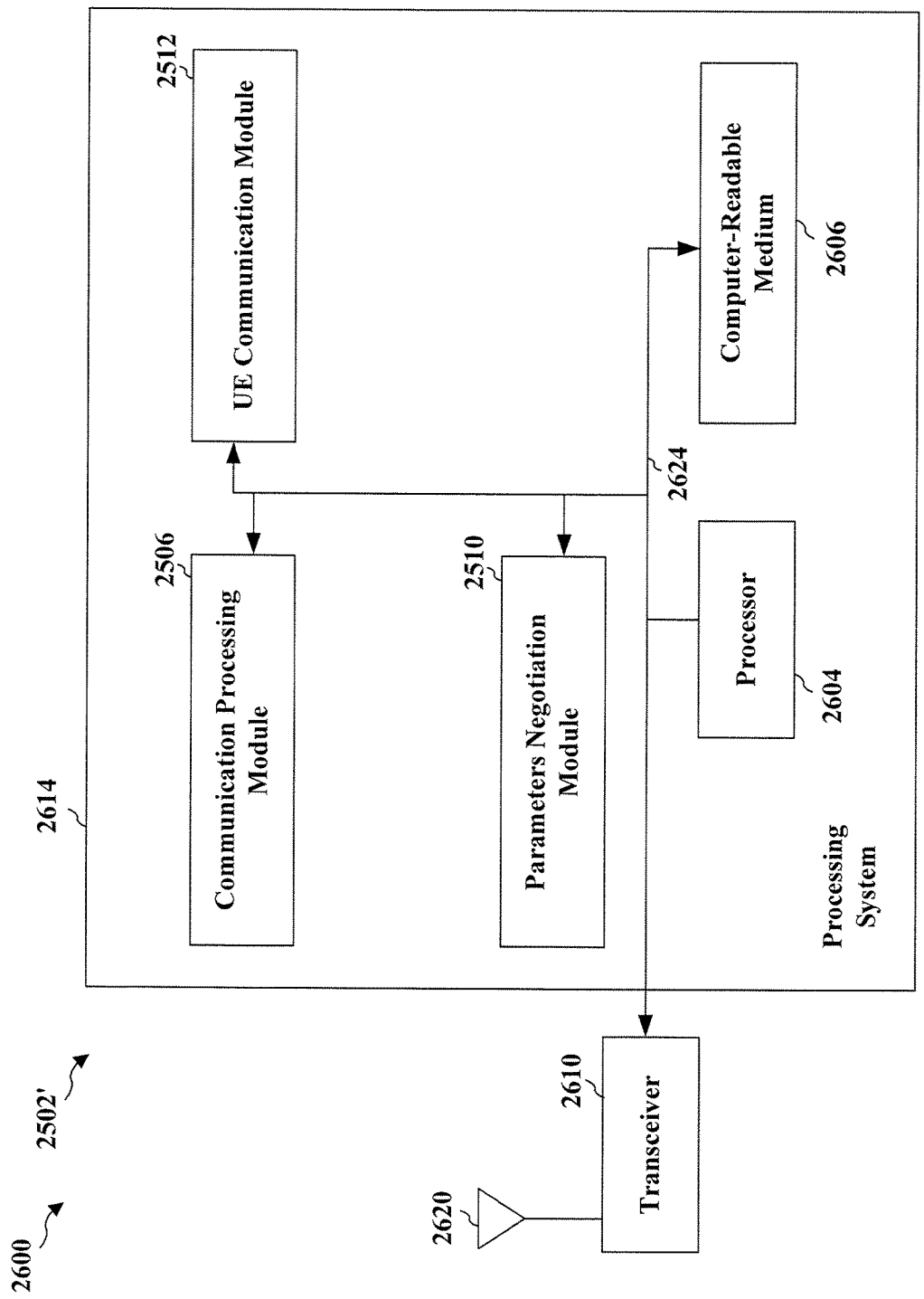
FIG. 26 is a diagram illustrating an example of a hardware implementation for a serving entity apparatus employing a processing system.

FIG. 26 is a diagram illustrating an example of a hardware implementation for an apparatus 2502' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware modules, represented by the processor 2604, the modules 2506, 2510, 2512, and the computer-readable medium 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The processing system 2614 includes a processor 2604 coupled to a computer-readable medium 2606. The processor 2604 is responsible for general processing, including the execution of software stored on the computer-readable medium 2606. The software, when executed by the processor 2604, causes the processing system 2614 to perform the various functions described supra for any particular apparatus. The computer-readable medium 2606 may also be used for storing data that is manipulated by the processor 2604 when executing software. The processing system further includes at least one of the modules 2506, 2510, 2512. The modules may be software modules running in the processor 2604, resident/stored in the computer readable medium 2606, one or more hardware modules coupled to the processor 2604, or some combination thereof.

In one configuration, the apparatus 2502/2502' for wireless communication includes means for receiving a first expression from a target UE, means for receiving a second expression from an initiator UE, and means for sending a page to the target UE upon determining that the second expression matches the first expression. The apparatus may further include means for receiving a time frame during which the target UE can be paged for communication. The apparatus may further include means for determining an identity/identifier comprising a DP-RNTI and at least one of a PGID derived from the first expression, a GUTI, a subset of the GUTI. The apparatus may further include means for sending to the target UE and the initiator UE a key for allowing the target UE and the initiator UE to communicate securely together. The aforementioned means may be one or more of the aforementioned modules of the apparatus 2502 and/or the processing system 2614 of the apparatus 2502' configured to perform the functions recited by the aforementioned means. When the apparatus is an eNB, the processing system 2614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 27:
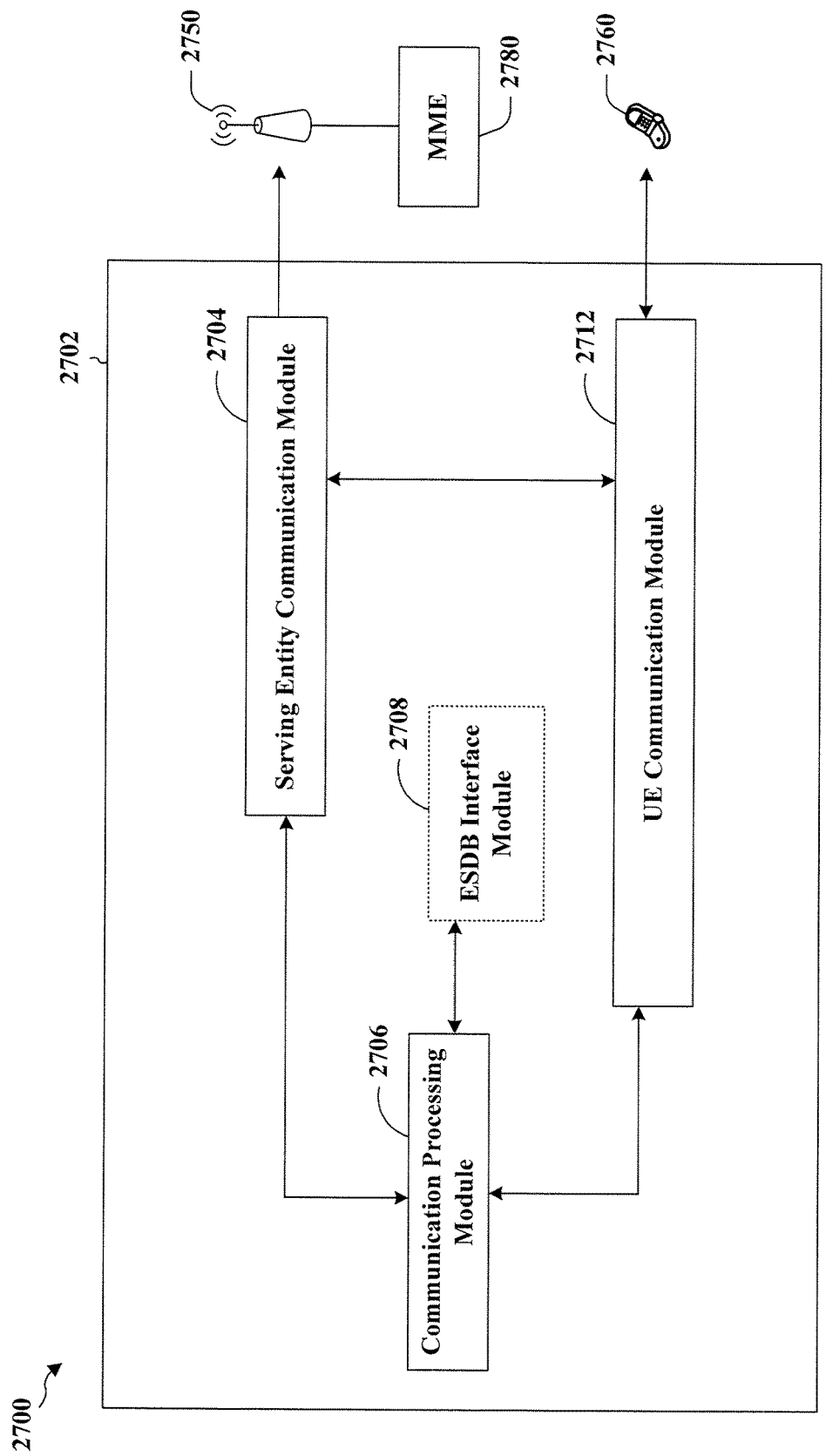
FIG. 27 is a conceptual data flow diagram illustrating the data flow between different modules/means/components in an example UE apparatus.

FIG. 27 is a conceptual data flow diagram 2700 illustrating the data flow between different modules/means/components in an example apparatus 2702. In a first configuration, the apparatus 2702 may be an initiator UE. In such a configuration, the initiator UE includes a ESDB interface module 2708 that is configured to determine a network address of a target UE 2760 based on a target expression. The network address is provided to a communication processing module 2706, which provides the network address to a UE communication module 2712. The UE communication module 2712 is configured to send a connection request including information associated with the initiator UE to the target UE 2760 at the determined network address. The initiator UE further includes a serving entity communication module 2704 that is configured to send information associated with the target UE 2760 to an MME 2780 serving the initiator UE. The serving entity communication module 2704 is further configured to receive from the MME 2780 serving the initiator UE a key for securely communicating with the target UE 2760.

The communication processing module 2706 may be configured to identify the target expression associated with the target UE 2760 and provided by the UE communication module 2712. The information associated with the initiator UE may include a network address of the initiator UE, an initiator expression of the initiator UE, information identifying the MME 2780 serving the initiator UE, etc. The connection request may further include the target expression. The serving entity communication module 2704 may be configured to send an initiator expression of the initiator UE along with the information to the MME 2780 serving the initiator UE. The serving entity communication module 2704 may be configured to send the target expression along with the information to the MME 2780 serving the initiator UE. The UE communication module 2712 may be configured to receive a connection response in response to the connection request. The connection response may be received after the key is received from the MME 2780 serving the initiator UE. The connection response may include information identifying an MME serving the target UE 2760, an identifier of the target UE 2760, etc. If the connection response is received before the information is sent to the MME 2780 serving the initiator UE, the information associated with the target UE 2760 may include information identifying the MME serving the target UE 2760, the identifier of the target UE 2760 received in the connection response, etc.

The apparatus may include additional modules that perform each of the blocks of the algorithm in the aforementioned flow chart of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a second configuration, the apparatus 2702 may be a target UE. The target UE includes a UE communication module 2712 that is configured to receive a connection request including information associated with an initiator UE 2760 from the initiator UE 2760. The target UE further includes a serving entity communication module 2704 that is configured to send the information associated with the initiator UE 2760 to an MME 2780 serving the target UE. The serving entity communication module 2704 is further configured to receive from the MME 2780 serving the target UE a key for securely communicating with the initiator UE 2760. The information associated with the initiator UE 2760 may include an initiator expression of the initiator UE 2760, information identifying an MME serving the initiator UE 2760, etc. The connection request may further include a target expression of the target UE. The serving entity communication module 2704 may be further configured to send a target expression of the target UE along with the information to the MME 2780 serving the target UE. The UE communication module 2712 may be configured to send a connection response in response to the connection request. The connection response may be sent after the key is received from the MME 2780 serving the target UE. The connection response may include information identifying the MME 2780 serving the target UE, an identifier of the target UE, etc. The connection response may be sent before the information is sent to the MME 2780 serving the target UE.

The apparatus may include additional modules that perform each of the blocks of the algorithm in the aforementioned flow chart of FIG. 15. As such, each step in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a third configuration, the apparatus 2702 may be a target UE. The target UE includes a serving entity communication module 2704 that is configured to communicate an expression of the target UE to a serving entity (eNB 2750 or MME 2780). The serving entity communication module 2704 is further configured to receive a page initiated from the serving entity for communicating with an initiator UE. The serving entity communication module 2704 may be further configured to communicate a time frame during which the target UE can be paged for communication. The received page may include a at least one of a PGID derived from the expression, a GUTI, or a subset of the GUTI and may be scrambled with a DP-RNTI. The received page may include an identifier associated with the initiator UE 2760. The serving entity communication module 2704 may be further configured to receive from the serving entity a key for securely communicating with the initiator UE 2712. The key is provided to the communication processing module 2706, which provides the key to the UE communication module 2712 to enable the UE communication module 2712 to communicate securely with the initiator UE 2760.

The apparatus may include additional modules that perform each of the blocks of the algorithm in the aforementioned flow chart of FIG. 17. As such, each step in the aforementioned flow chart of FIG. 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a fourth configuration, the apparatus 2702 may be a target UE. The target UE includes a UE communication module 2712 that is configured to broadcast information for identifying an MME 2780 serving the target UE along with a target expression of the target UE. The target UE further includes a serving entity communication module 2704 that is configured to receive from the MME 2780 serving the target UE a key for communicating with an initiator UE 2760. The key is provided to the communication processing module 2706, which provides the key to the UE communication module 2712 to enable the UE communication module 2712 to communicate securely with the initiator UE 2760 based on the key. The key may be for communicating directly with the initiator UE 2760. Alternatively, the key may be for communicating through a WWAN with the initiator UE 2760.

The apparatus may include additional modules that perform each of the blocks of the algorithm in the aforementioned flow chart of FIG. 19. As such, each step in the aforementioned flow chart of FIG. 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

In a fifth configuration, the apparatus 2702 may be an initiator UE. The initiator UE includes a UE communication module 2712 that is configured to receive a broadcast including a target expression of a target UE 2760 and information for identifying an MME serving the target UE 2760. The initiator UE further includes a serving entity communication module 2704 that is configured to send the target expression and the information to an MME 2780 serving the initiator UE. The serving entity communication module 2704 is further configured to receive from the MME 2780 serving the initiator UE a key for communicating with the target UE 2760. The serving entity communication module 2704 provides the key to the communication processing module 2706, which provides the key to the UE communication module 2712 to enable the UE communication module 2712 to communicate securely with the target UE 2760 based on the key. The key may be for communicating directly with the target UE. Alternatively, the key may be for communicating through a WWAN with the target UE.

The apparatus may include additional modules that perform each of the blocks of the algorithm in the aforementioned flow chart of FIG. 20. As such, each step in the aforementioned flow chart of FIG. 20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 28:
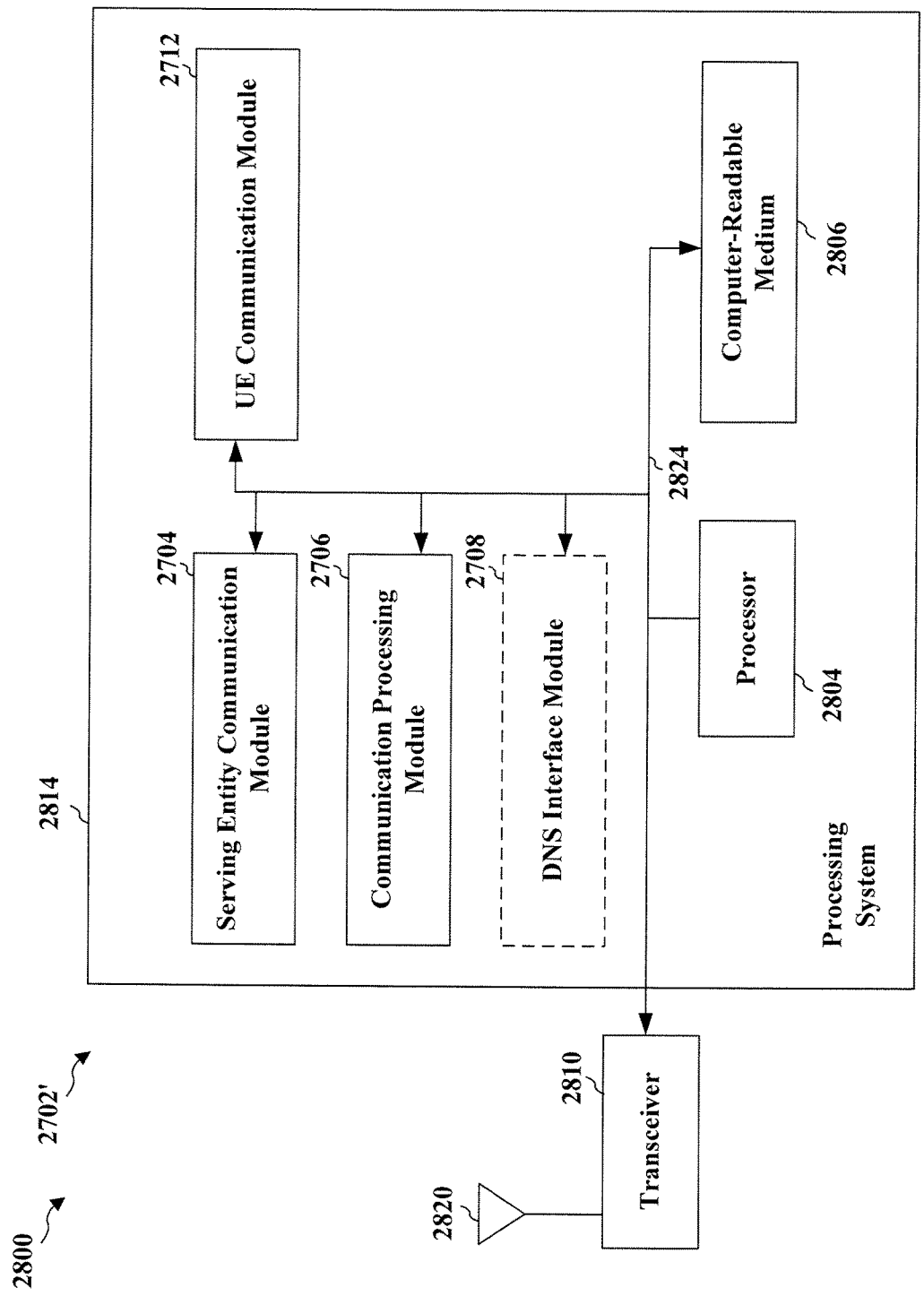
FIG. 28 is a diagram illustrating an example of a hardware implementation for a UE apparatus employing a processing system.

FIG. 28 is a diagram illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware modules, represented by the processor 2804, the modules 2704, 2706, 2708, 2712, and the computer-readable medium 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The processing system 2814 includes a processor 2804 coupled to a computer-readable medium 2806. The processor 2804 is responsible for general processing, including the execution of software stored on the computer-readable medium 2806. The software, when executed by the processor 2804, causes the processing system 2814 to perform the various functions described supra for any particular apparatus. The computer-readable medium 2806 may also be used for storing data that is manipulated by the processor 2804 when executing software. The processing system further includes at least one of the modules 2704, 2706, 2708, 2712. The modules may be software modules running in the processor 2804, resident/stored in the computer readable medium 2806, one or more hardware modules coupled to the processor 2804, or some combination thereof. The processing system 2814 may be a component of the UE 650 and may include the memory 660 and/or at least one of the TX processor 668, the RX processor 656, and the controller/processor 659.

In one configuration, the apparatus 2702/2702' for wireless communication includes means for determining a network address of a target UE based on a target expression, means for sending a connection request including information associated with the initiator UE to the target UE at the determined network address, means for sending information associated with the target UE to an MME serving the initiator UE, and means for receiving from the MME serving the initiator UE a key for securely communicating with the target UE. The apparatus may further include means for identifying the target expression associated with the target UE. The apparatus may further include means for sending an initiator expression of the initiator UE along with the information to the MME serving the initiator UE. The apparatus may further include means for sending the target expression along with the information to the MME serving the initiator UE. The apparatus may further include means for receiving a connection response in response to the connection request. The aforementioned means may be one or more of the aforementioned modules of the apparatus 2702 and/or the processing system 2814 of the apparatus 2702' configured to perform the functions recited by the aforementioned means. As described supra, the processing system 2814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In another configuration, the apparatus 2702/2702' for wireless communication includes means for receiving a connection request including information associated with an initiator UE from the initiator UE, means for sending the information associated with the initiator UE to an MME serving the target UE, and means for receiving from the MME serving the target UE a key for securely communicating with the initiator UE. The apparatus may further include means for sending a target expression of the target UE along with the information to the MME serving the target UE. The apparatus may further include means for sending a connection response in response to the connection request. The aforementioned means may be one or more of the aforementioned modules of the apparatus 2702 and/or the processing system 2814 of the apparatus 2702' configured to perform the functions recited by the aforementioned means. As described supra, the processing system 2814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In another configuration, the apparatus 2702/2702' for wireless communication includes means for communicating an expression of the target UE to a serving entity, and means for receiving a page initiated from the serving entity for communicating with an initiator UE. The apparatus may further include means for communicating a time frame during which the target UE can be paged for communication. The apparatus may further include means for receiving from the serving entity a key for securely communicating with the initiator UE. The aforementioned means may be one or more of the aforementioned modules of the apparatus 2702 and/or the processing system 2814 of the apparatus 2702' configured to perform the functions recited by the aforementioned means. As described supra, the processing system 2814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In another configuration, the apparatus 2702/2702' for wireless communication includes means for broadcasting information for identifying an MME serving the target UE along with a target expression of the target UE, means for receiving from the MME serving the target UE a key for communicating with an initiator UE, and means for communicating securely with the initiator UE based on the key. The aforementioned means may be one or more of the aforementioned modules of the apparatus 2702 and/or the processing system 2814 of the apparatus 2702' configured to perform the functions recited by the aforementioned means. As described supra, the processing system 2814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In another configuration, the apparatus 2702/2702' for wireless communication includes means for receiving a broadcast comprising a target expression of a target UE and information for identifying an MME serving the target UE, means for sending the target expression and the information to an MME serving the initiator UE, means for receiving from the MME serving the initiator UE a key for communicating with the target UE, and means for communicating securely with the target UE based on the key. The aforementioned means may be one or more of the aforementioned modules of the apparatus 2702 and/or the processing system 2814 of the apparatus 2702' configured to perform the functions recited by the aforementioned means. As described supra, the processing system 2814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a target user equipment (UE), comprising:
   communicating, by a transceiver to a serving entity, an expression of the target UE and a time frame during which the target UE can be paged for communication;
   receiving a page initiated from the serving entity for communicating with an initiator UE, wherein the received page includes an identifier associated with the initiator UE and at least one of a paging identifier (PGID) derived from the expression, a Globally Unique Temporary Identifier (GUTI), or a subset of the GUTI, and is scrambled with a direct paging radio network temporary identifier (DP-RNTI);
   receiving a key from the serving entity for securely communicating with the initiator UE; and
   communicating securely by the target UE with the initiator UE, via peer-to-peer communications, wherein the communications are based on the page and the identifier associated with the initiator UE.

2. The method of claim 1, wherein the serving entity comprises one of a network entity, an evolved Node B (eNB) or a mobility management entity (MME).

3. A target user equipment (UE) for wireless communication, comprising:
   means for communicating, to a serving entity, an expression of the target UE and a time frame during which the target UE can be paged for communication;
   means for receiving a page initiated from the serving entity for communicating with an initiator UE, wherein the received page includes an identifier associated with the initiator UE and at least one of a paging identifier (PGID) derived from the expression, a Globally Unique Temporary Identifier (GUTI), or a subset of the GUTI, and is scrambled with a direct paging radio network temporary identifier (DP-RNTI);
   means for receiving a key from the serving entity for securely communicating with the initiator UE; and
   wherein the means for communicating are further configured to communicate securely by the target UE with the initiator UE via peer-to-peer communications, wherein the communications are based on the page and the identifier associated with the initiator UE.

4. The target UE of claim 3, wherein the serving entity comprises one of an evolved Node B (eNB) or a mobility management entity (MME).

5. A target user equipment (UE) for wireless communication, comprising:
   a processing system configured to:
   communicate, to a serving entity, an expression of the target UE and a time frame during which the target UE can be paged for communication;
   receive a page initiated from the serving entity for communicating with an initiator UE, wherein the received page includes an identifier associated with the initiator UE and at least one of a paging identifier (PGID) derived from the expression, a Globally Unique Temporary Identifier (GUTI), or a subset of the GUTI, and is scrambled with a direct paging radio network temporary identifier (DP-RNTI);
   receive a key from the serving entity for securely communicating with the initiator UE; and
   communicate securely by the target UE with the initiator UE via peer-to-peer communications, wherein the communications are based on the page and the identifier associated with the UE.

6. A non-transitory computer-readable medium storing computer code executable by a processor of a target user equipment (UE) for wireless communication, comprising code for:
   communicating, to a serving entity, an expression of the target UE and a time frame during which the target UE can be paged for communication;
   receiving a page initiated from the serving entity for communicating with an initiator UE, wherein the received page includes an identifier associated with the initiator UE and at least one of a paging identifier (PGID) derived from the expression, a Globally Unique Temporary Identifier (GUTI), or a subset of the GUTI, and is scrambled with a direct paging radio network temporary identifier (DP-RNTI);
   receiving a key from the serving entity for securely communicating with the initiator UE; and
   communicating securely by the target UE with the initiator UE via peer-to-peer communications, wherein the communications are based on the page and the identifier associated with the initiator UE.

* * * * *